United States Patent
Kwak et al.

(10) Patent No.: US 10,437,284 B2
(45) Date of Patent: *Oct. 8, 2019

(54) ELECTRONIC DEVICE INCLUDING DISPLAY

(71) Applicant: SAMSUNG ELECTRONICS CO., LTD., Suwon-si, Gyeonggi-do (KR)

(72) Inventors: Ki Ju Kwak, Seoul (KR); Sung Gwan Woo, Hwaseong-si (KR); Sung Ho Ahn, Seoul (KR); Hun Jo Jung, Seoul (KR); Soon Ik Park, Incheon (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/875,241

(22) Filed: Jan. 19, 2018

(65) Prior Publication Data
US 2018/0203483 A1 Jul. 19, 2018

(30) Foreign Application Priority Data
Jan. 19, 2017 (KR) .................... 10-2017-0009412

(51) Int. Cl.
*G06F 1/16* (2006.01)
*H04M 1/02* (2006.01)

(52) U.S. Cl.
CPC .......... *G06F 1/1613* (2013.01); *G06F 1/1637* (2013.01); *H04M 1/0266* (2013.01); *G02F 2202/28* (2013.01)

(58) Field of Classification Search
CPC ... G06F 1/1637; C09J 7/35; C09J 7/38; G02F 2202/28
See application file for complete search history.

(56) References Cited

U.S. PATENT DOCUMENTS

| | | | |
|---|---|---|---|
| 6,284,086 B1 * | 9/2001 | Cardellino | B29C 65/1687 156/273.7 |
| 7,901,532 B2 * | 3/2011 | Bain | B29C 65/76 156/247 |
| 9,279,068 B2 | 3/2016 | Lee et al. | |
| 9,317,062 B2 | 4/2016 | Kuo | |
| 9,507,383 B2 | 11/2016 | Dighde et al. | |
| 9,927,847 B2 | 3/2018 | Dighde et al. | |
| 2002/0134543 A1 * | 9/2002 | Estes | B32B 7/04 165/277 |

(Continued)

FOREIGN PATENT DOCUMENTS

KR 10-2013-0143132 12/2013
WO 2012/092342 7/2012

OTHER PUBLICATIONS

Extended Search Report dated Apr. 30, 2018 in counterpart European Patent Application No. 18152560.1.

*Primary Examiner* — Adrian S Wilson
(74) *Attorney, Agent, or Firm* — Nixon & Vanderhye P.C.

(57) ABSTRACT

An electronic device is provided. The electronic device may include a display module, a bracket disposed on a rear surface of the display module, and a first adhesive member which fixes at least a portion of the display module to the bracket, between the display module and the bracket. The first adhesive member may have adhesive force which is reduced to a specified value or less by at least one of force, light, and/or heat applied from outside.

18 Claims, 16 Drawing Sheets

(56) References Cited

U.S. PATENT DOCUMENTS

| | | | |
|---|---|---|---|
| 2009/0183819 A1* | 7/2009 | Matsuhira | B32B 37/12 |
| | | | 156/99 |
| 2010/0103641 A1* | 4/2010 | Cho | H01L 51/524 |
| | | | 361/829 |
| 2010/0175829 A1* | 7/2010 | Masuda | C09J 5/06 |
| | | | 156/711 |
| 2012/0244343 A1* | 9/2012 | Stiehl | C09J 5/06 |
| | | | 428/332 |
| 2013/0020031 A1* | 1/2013 | Fujita | B32B 43/006 |
| | | | 156/711 |
| 2014/0139760 A1 | 5/2014 | Lee et al. | |
| 2014/0272332 A1* | 9/2014 | Reineman | B32B 7/06 |
| | | | 428/201 |
| 2015/0062462 A1 | 3/2015 | Kuo | |
| 2015/0083341 A1* | 3/2015 | Everaerts | C09J 7/29 |
| | | | 156/711 |
| 2015/0153776 A1* | 6/2015 | Cheng | G06F 1/1637 |
| | | | 428/173 |
| 2016/0059615 A1* | 3/2016 | Xie | B43K 23/001 |
| | | | 434/408 |
| 2016/0091932 A1 | 3/2016 | Dighde et al. | |
| 2016/0279862 A1* | 9/2016 | Larsen | B26F 3/12 |
| 2016/0370617 A1* | 12/2016 | Miyashita | G02F 1/133308 |
| 2016/0378140 A1* | 12/2016 | Bergmann | B23B 7/12 |
| | | | 361/679.26 |
| 2017/0003723 A1 | 1/2017 | Jun et al. | |
| 2017/0023989 A1 | 1/2017 | Dighde et al. | |

* cited by examiner

ELECTRONIC DEVICE INCLUDING DISPLAY

CROSS-REFERENCE TO RELATED APPLICATION(S)

This application is based on and claims the benefit under 35 U.S.C. § 119 of a Korean patent application filed on 19 Jan., 2017 in the Korean Intellectual Property Office and assigned Serial number 10-2017-0009412, the entire disclosure of which is hereby incorporated herein by reference.

FIELD

The present disclosure relates to an electronic device including a display.

BACKGROUND

An electronic device, such as a smart phone or a tablet PC, may include a display. The electronic device may output various types of content, such as a text or an image, through the display. The display may be implemented through a display module (or a display device) including a window panel exposed to the outside, a touch panel disposed therein, a display panel, and/or the like which are stacked. The display module may be fixed to the inside of the electronic device in various manners. For example, the display module may be fixed to a bracket (or a housing) inside the electronic device through double-sided tape.

SUMMARY

An electronic device according to the related art employs an adhesive member, such as double-sided tape, to bond a display module to a bracket. In the case of removing the adhesive member from the display module during re-bonding of the display module in the manufacturing process of the electronic device, the residues of the adhesive member, such as the double-sided tape, may remain as foreign matter in the display module. Accordingly, a shielding base material, such as a copper (Cu) sheet or sponge for protecting the display module may be damaged by the foreign matter. Further, in the case that stiffness is weakened as the performance of the display module is heightened, the re-bonding of the display module may be difficult.

The electronic device according to the related art may have a problem that the waterproof performance thereof is deteriorated due to the damage to the display module resulting from the re-bonding of the display module. Accordingly, the production cost may be increased as the damaged display module may be replaced with a new one.

Aspects of the present disclosure are to address one or more of the above-mentioned problems and/or disadvantages, and/or to provide one or more of the advantages described below.

In accordance with an example aspect of the present disclosure, an electronic device may include a display module, a bracket disposed on a rear surface of the display module, and a first adhesive member which fixes at least a portion of the display module to the bracket. The first adhesive member may have adhesive force reduced to a specified value or less by at least one of force, light, or heat applied from an outside.

In the electronic device according to various example embodiments of the present disclosure, a stretchable material and/or a UV reactive material may be utilized for an adhesive and/or an inner basic material of double-sided tape, in the example case that the display module is bonded to the bracket positioned on a rear surface of the electronic device.

In the electronic device according to various example embodiments of the present disclosure, when the display module is re-bonded, the foreign matters need not remain, and the damage to the display module may be prevented/reduced. Accordingly, the re-binding process for the display module may be easily performed, the production cost of the display module may be reduced, and a product failure rate may be reduced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
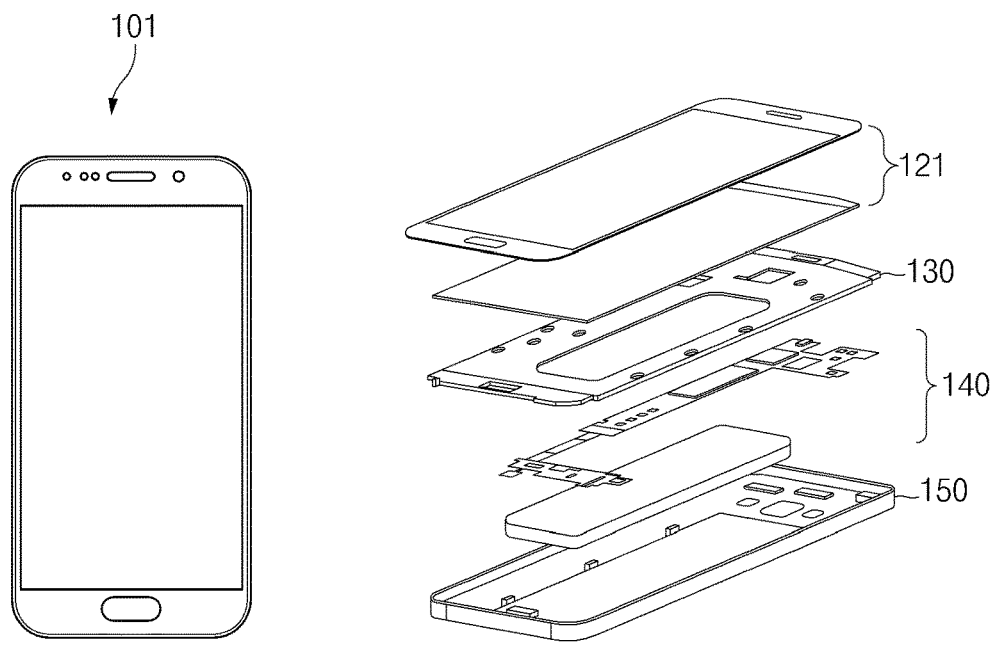
FIG. 1 illustrates an electronic device, according to various embodiments.
Figure 1:
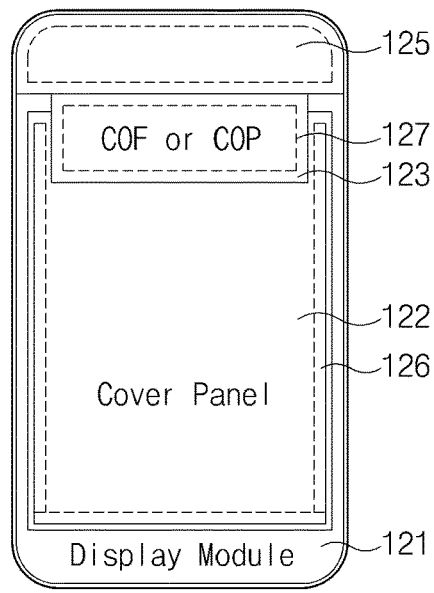

Hereinafter, various example embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" or "bonded to" another element (for example, a second element), it can be directly coupled with/to or connected to the other element or an intervening element(s) (for example, a third element(s)) may be present. In contrast, when an element (for example, a first element) is referred to as being "directly coupled with/to" or "directly connected to" another element (for example, a second element), it should be understood that there is no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified example embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various example embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various example embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some example embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another example embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various example embodiments of the present disclosure, the electronic device may be one or a combination of the aforementioned devices. The electronic device according to some example embodiments of the present disclosure may be a flexible electronic device. Further, the electronic device according to an example embodiment of the present disclosure is not limited to the aforementioned devices, but may include new electronic devices produced due to the development of technologies.

Hereinafter, electronic devices according to example embodiments of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device, according to various example embodiments.

Referring to FIG. 1, an electronic device 101 may output various types of content (e.g., a text, an image, or the like) through a display.

The display may be implemented through a display module (or a display device) including a window panel exposed to the outside, a touch panel disposed therein, a display panel, and/or the like which are stacked. The window panel (or a window cover) may protect the touch panel and the display panel from external impact. The touch panel may recognize a touch action of a user. The touch panel may transmit a signal corresponding to the touch action of the user to a processor.

The display panel may include an active area, to which a text or an image is output, and a non-active area including a circuit for driving the active area. The active area may be an area to which a text or an image is output under the control of an internal processor or a display driver integrated circuit (DDI). The active area may be disposed in the central area of the display panel. The non-active area may include an area including wirings, circuits, or the like for driving of the active area. The non-active area may be an edge area surrounding the active area.

In an exploded perspective view of the electronic device 101, a display module 121 may include a window panel (or a window cover) exposed to the outside, a touch panel disposed at the inside thereof, and a display panel.

The display module 121 may be bonded to a bracket 130 provided inside the electronic device 101 through various adhesive members (e.g., double-sided tape) to be fixed.

The bracket (or the housing) 130 may allow the display module 121 and an internal circuit part 140 to be mounted thereon and may fix the display module 121 and an internal circuit part 140 thereto. The internal circuit part 140 may include various elements, such as a sensor, a vibration unit, a battery, and/or a printed and/or flex circuit board (PCB), for driving. A case part (or an external housing) 150 surrounds at least part of the rear surface of the electronic device 101 to protect the electronic device 101.

A cover panel 122 (or a shielding member, or a shielding layer) may be mounted on the rear surface of the display module 121. The cover panel 122 may be disposed while focusing on the rear surface of the active area. The cover panel 122 may include an intermediate member and/or a metal sheet.

Various adhesive members may be mounted on the rear surfaces (the internal surfaces) of the display module 121 and/or the cover panel 122 to be bonded to the bracket 130. For example, the various adhesive members may include an adhesive member (not illustrated) between the display module 121 and the cover panel 122, an adhesive member 125 between the edge area (or the non-active area) of the display module 121 and the bracket 130, an adhesive member 126 between the cover panel 122 and the bracket 130, and an adhesive member 127 between the cover panel 122 and a flexible printed circuit board (FPCB) 123. Each adhesive member may include a stretchable material or a material having a UV reaction characteristic in at least a portion of the adhesive member, thereby facilitating a process of separating the display module 121. Additional information on the adhesive member(s) will be provided in FIGS. 2 to 15.

FIGS. 2 to 7 illustrate various forms of adhesive members provided inside the cover panel, according to various example embodiments.

The cover panel 122 (or a shielding member or a shielding layer) may be interposed between the display module 121 and the bracket 130. The cover panel 122 may be attached to a rear surface of the central area (or the active area) of the display module 121. The cover panel 122 may perform a function of blocking heat and/or an electrical signal generated from the display module 121, compensating for a step difference between mechanisms, absorbing impact, and/or the like.

The cover panel 122 may include an adhesive member formed on a top surface (a surface facing the display module 121) thereof such that the cover panel 122 is fixed to the display module 121. The adhesive member may be implemented in one adhesive layer (e.g., by applying an adhesive material) or in multiple layers (e.g., in the form of a double-sided tape).

According to various example embodiments, the adhesive force of the adhesive member may be weakened or cancelled out by force applied thereto from the outside or light incident thereto from the outside. In this case, the cover panel 122 may be separated from the display module 121.

Figure 2:
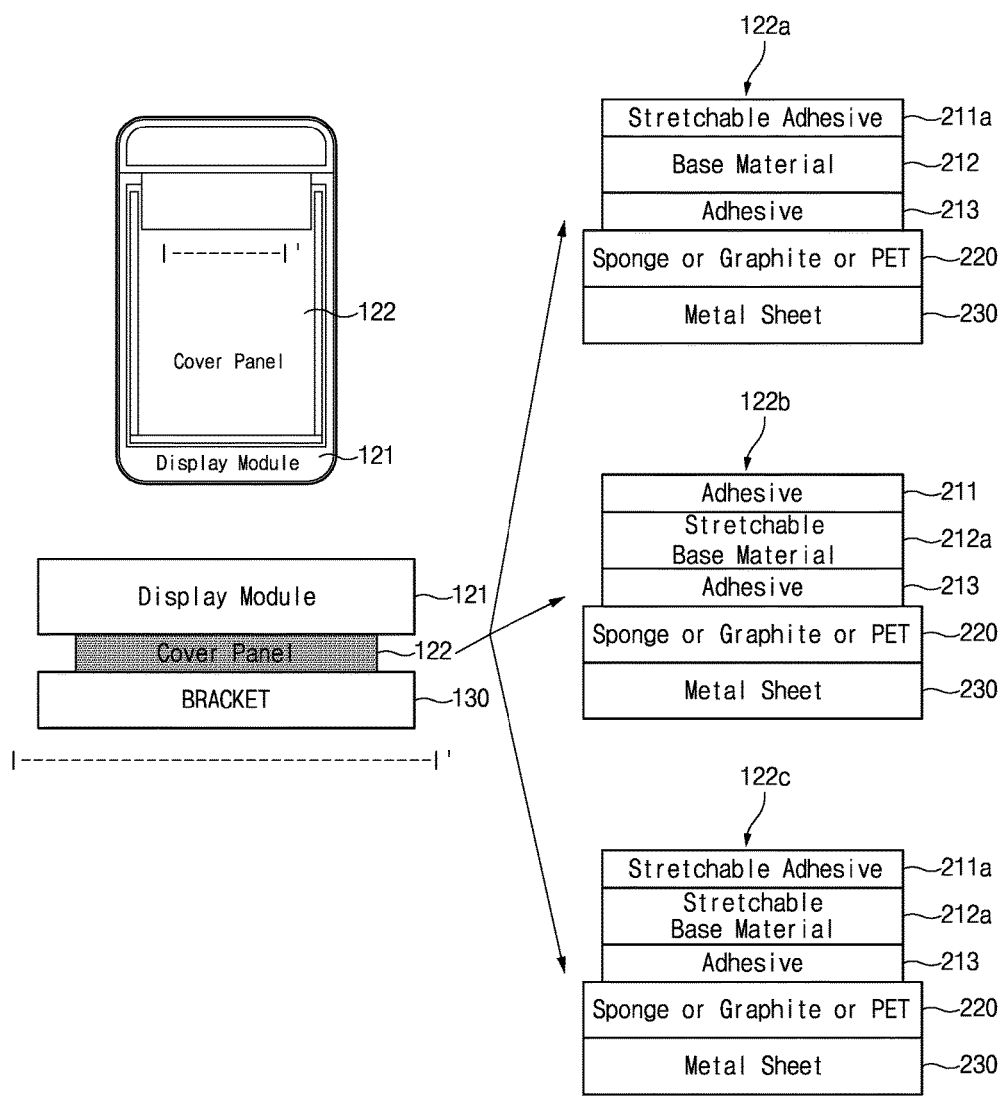
FIGS. 2, 3, 4, 5, 6, and 7 illustrate various forms of adhesive members provided inside a cover panel, according to various embodiments.

FIG. 2 illustrates sectional views of cover panels to which a stretchable double-side tape is attached, according to various example embodiments.

Referring to FIG. 2, the cover panel 122 may be attached to the rear surface of the display module 121. In the sectional view taken along line I-I', the cover panel 122 may be interposed between the display module 121 (e.g., the display panel) and the bracket 130. The cover panel 122 may have the form in which a first adhesive layer 211 or 211a, a base material layer 212 or 212a, a second adhesive layer 213, an intermediate member (e.g., layer/film) 220, and a metal sheet/film 230 are sequentially stacked.

The first adhesive layer 211 or 211a, the base material layer 212 or 212a, and a second adhesive layer 213 may be provided in the form of a double-sided tape. The first adhesive layer 211 or 211a may be attached to the display module 121, and the second adhesive layer 213 may be attached to the intermediate member/film 220.

The intermediate member/film 220 may be interposed between the second adhesive layer 213 and the metal sheet/film 230. The intermediate member 220 may be implemented with a material such as sponge, graphite, or polyethylene terephthalate (PET). The intermediate member 220 may perform a buffer function and/or a heat radiation function. The intermediate member 220 may be bonded to the metal sheet 230 through an additional adhesive layer (not illustrated).

The metal sheet 230 may be disposed on the lowest end of the cover panel 122 to make contact with the bracket 130. The metal sheet 230 may block heat and/or an electrical signal to be generated from the display module 121. The metal sheet 230 may be bonded to the bracket 130 through an additional adhesive member. The metal sheet 230 may be implemented with a Cu sheet for example.

According to various example embodiments, at least a portion of the first adhesive layer 211a and/or the base material layer 212a of the cover panel 122 may be implemented with a material stretched by force applied from the outside. In the case that force is applied to the first adhesive layer 211a or the base material layer 212a in an outward direction perpendicular to a direction of stacking the first adhesive layer 211a or the base material layer 212a, the adhesive force of the top surface of the cover panel 122 may be lowered or canceled out. Accordingly, the display module 121 and the cover panel 122 may be separated from each other.

According to a first example embodiment, a cover panel 122a may have the first adhesive layer 211a, which is stretchable by external force, and the base material layer 212 and the second adhesive layer 213 of the cover panel 122a may have a non-stretchable characteristic. For example, the first adhesive layer 211a may be implemented with a urethane-based or epoxy-based material rather than an acryl-based material.

In the case that a user attempts to, for a re-bonding work, separate the cover panel 122a from the display module 121 in the state that the cover panel 122a is bonded to the display module 121, the user applies force of drawing the base material layer 212 (or the whole layer of the first adhesive layer 211a, the base material layer 212, and the second adhesive layer 213) in a side-surface direction (a direction perpendicular to a stack direction of the cover panel 122a or a direction perpendicular to a display surface) of the electronic device, thereby weakening or canceling out the adhesive force of the first adhesive layer 211a.

Still referring to FIG. 2, according to a second example embodiment, a cover panel 122b may have the base material layer 212a, which is stretchable by external force, and the first adhesive layer 211 and the second adhesive layer 213 of the cover panel 122b may have a non-stretchable characteristic. For example, the base material layer 212a may be implemented with a material which is at least partially mixed with a rubber-based material or a urethane-based material.

In the case that a user attempts to, for a re-bonding work, separate the cover panel 122b from the display module 121 in the state that the cover panel 122b is bonded to the display module 121, the user applies force of drawing the base material layer 212a (or the whole layer of the first adhesive layer 211, the base material layer 212a, and the second adhesive layer 213), which is stretchable, in a side-surface direction (a direction perpendicular to a stack direction of the cover panel 122 or a direction perpendicular to a display surface) of the electronic device, thereby weakening or canceling out the adhesive force of the first adhesive layer 211.

According to a third example embodiment, in a cover panel 122c, the first adhesive layer 211a and the base material layer 212a may both be stretchable by external force, and the second adhesive layer 213 may have a non-stretchable characteristic. The manner of separating the cover panel 122c from the display module 121 may be identical to or similar to that of the first example embodiment or the second example embodiment in FIG. 2.

Figure 3:
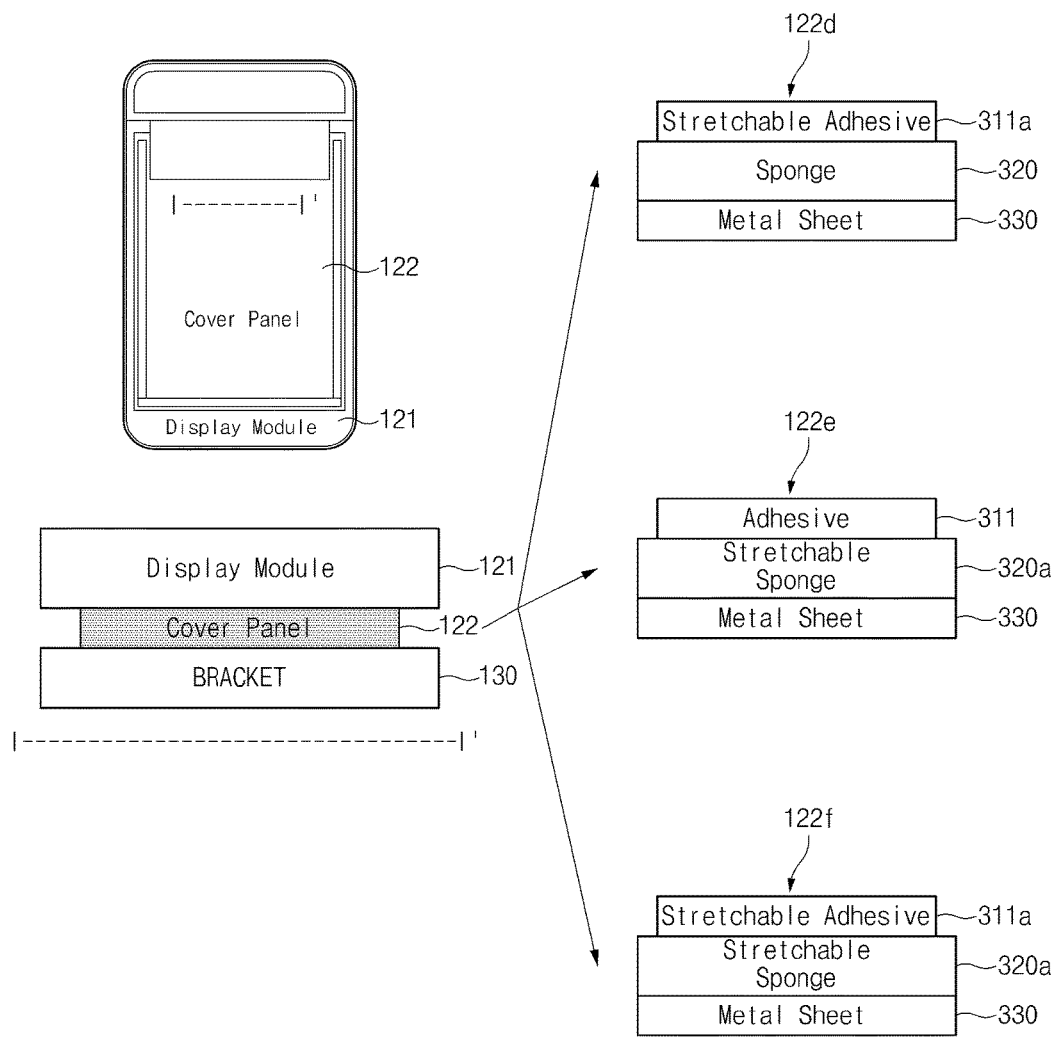

FIG. 3 illustrates sectional views of cover panels in which an adhesive member formed of a single layer without a base material layer, according to various example embodiments.

Referring to FIG. 3, the cover panel 122 may be attached to the rear surface of the display module 121. In the sectional view taken along line I-I', the cover panel 122 may be interposed between the display module 121 (e.g., the display panel) and the bracket 130. The cover panel 122 may have the form in which an adhesive member 311 or 311a, an intermediate member/layer/film 320 or 320a, and a metal sheet/film 330 are sequentially stacked. Differently from the sectional view of FIG. 2, the adhesive member 311 or 311a may be implemented in a single layer.

The adhesive member 311 or 311a may bond the display module 121 to the intermediate member 320 or 320a to fix the display module 121 to the intermediate member 320 or 320a. According to various example embodiments, the adhesive member 311 or 311a may be implemented in an embossed pattern.

According to various example embodiments, at least a portion of the adhesive member 311a and/or the intermediate member (or the buffer member) 320a of the cover panel 122 may be implemented in the form of being stretched by force applied to the cover panel 122 from the outside. In the case that force is applied in an outward direction perpendicular to a direction of stacking the adhesive member 311a or the intermediate member 320, the adhesive force of a top surface of the cover panel 122 may be lowered or canceled out and the cover panel 122 may be separated from the display module 121.

According to a first example embodiment, a cover panel 122d may have the first adhesive member 311a, which is stretchable by external force, and the intermediate member 320 may have a non-stretchable characteristic.

In the case that a user attempts to, for a re-bonding work, separate the cover panel 122d from the display module 121 in the state that the cover panel 122d is bonded to the display module 121, the user applies force of drawing the adhesive member 311a, which is stretchable, in a side-surface direction (a direction perpendicular to a stack direction of the cover panel 122d or a direction perpendicular to a display surface) of the electronic device, thereby weakening or canceling out the adhesive force of the adhesive member 311a.

According to a second example embodiment, a cover panel 122e may have the intermediate member 320a, which is stretchable by external force, and the adhesive member 311 may have a non-stretchable characteristic.

In the case that a user attempts to, for a re-bonding work, separate the cover panel 122e from the display module 121 in the state that the cover panel 122e is bonded to the display module 121, the user applies force of drawing the intermediate member 320a, which is stretchable, in a side-surface direction (a direction perpendicular to a stack direction of the cover panel 122e) of the electronic device, thereby weakening or canceling out the adhesive force of the adhesive member 311.

According to a third example embodiment, a cover panel 122f may include the adhesive member 311a and the intermediate member/layer/film 320a having characteristics which are stretchable by external force. If all of the adhesive member 311a and the intermediate member 320a are stretched, the whole elongation of the cover panel 122f may be increased. The manner of separating the cover panel 122f from the display module 121 may be identical to or similar to that of the first example embodiment or the second example embodiment.

Figure 4:
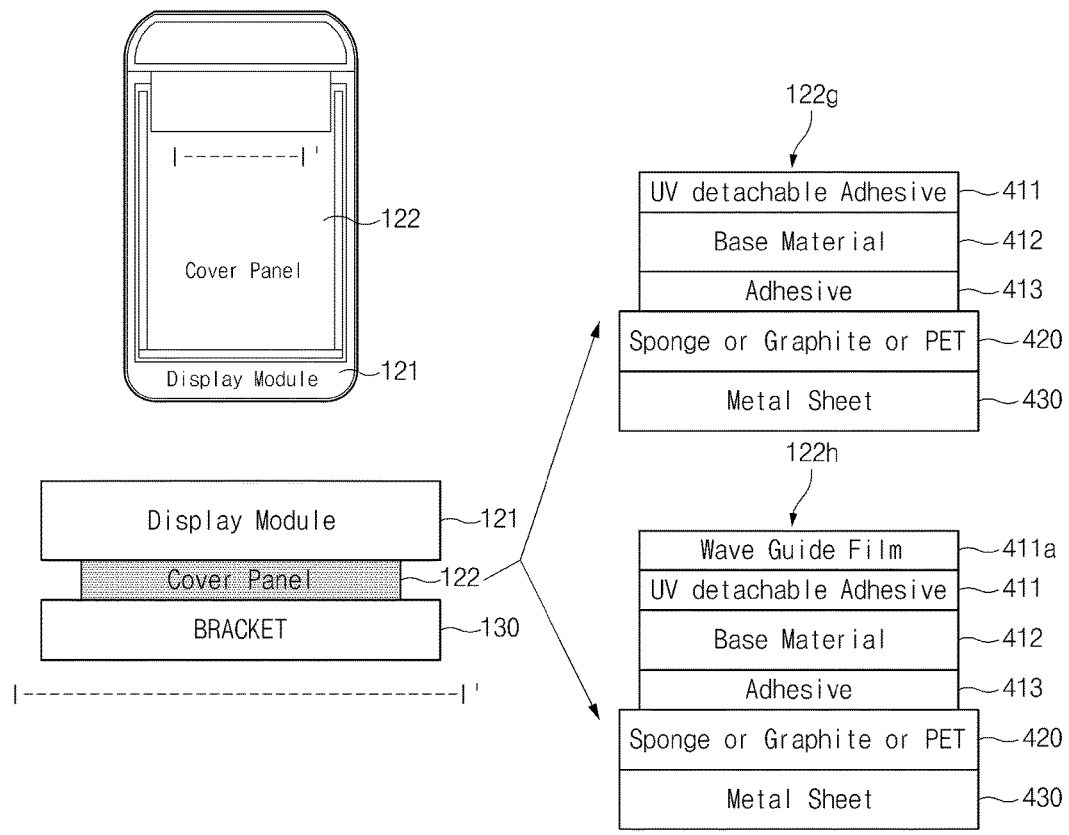

FIG. 4 illustrates sectional views of cover panels in which a double-sided tape having a UV reaction characteristic are attached, according to various example embodiments.

Referring to FIG. 4, the cover panel 122 may be attached to the rear surface of the display module 121. In the sectional view taken along line I-I', the cover panel 122 may be interposed between the display module 121 (e.g., the display panel) and the bracket 130. The cover panel 122 may include a first adhesive layer (or a UV reaction layer) 411, a base material layer 412 (e.g., which may be replaced with a guide film layer), a second adhesive layer 413, an intermediate member 420, and a metal sheet 430.

The first adhesive layer 411, the base material layer 412, and the second adhesive layer 413 may have the form of a double-sided tape. The first adhesive layer 411 may be attached to the display module 121, and the second adhesive layer 413 may be attached to the intermediate member 420.

According to various example embodiments, the first adhesive layer 411 of the cover panel 122 may be implemented with a material having adhesive force which is reduced or canceled out in the case that UV light is irradiated onto the first adhesive layer 411.

According to a first example embodiment, a cover panel 122g may include the first adhesive layer 411 having a UV reaction characteristic, which is provided on a surface of the cover panel 122g making contact with the display module 121. In the case that a user attempts to, for a re-bonding work, separate the cover panel 122g from the display module 121 in the state that the cover panel 122g is bonded to the display module 121, the user may separate the cover panel 122g from the display module 121 by irradiating UV light having a specified wavelength onto the first adhesive layer 141.

According to a second example embodiment, a cover panel 122h may include a guide film layer (e.g., a wave guide film) 411a provided on the first adhesive layer 411 in addition to the elements of the cover panel 122g according to the first example embodiment. In the case that the UV light is irradiated onto the first adhesive layer 411, the UV light may be incident on the side surface of the cover panel 122h (in a direction perpendicular to a stack surface of the cover panel 122h). In this case, the light may be not uniformly transmitted throughout the entire area of the first adhesive layer 411. The guide film layer 411a may uniformly transmit light throughout the entire area of the first adhesive layer 411 by reflecting or guiding the light incident to the side surface of the cover panel 122h. According to various example embodiments, the guide film layer 411a may be bonded to the display module 121 through an additional adhesive layer (not illustrated) between the display module 121 and the guide film layer 411a.

According to various example embodiments, the guide film layer 411a may be replaced with a PET layer attached to the lower end of the display module 121. For example, the PET layer may uniformly transmit light throughout the entire area of the first adhesive layer 411 by reflecting and/or guiding the light.

Figure 5:
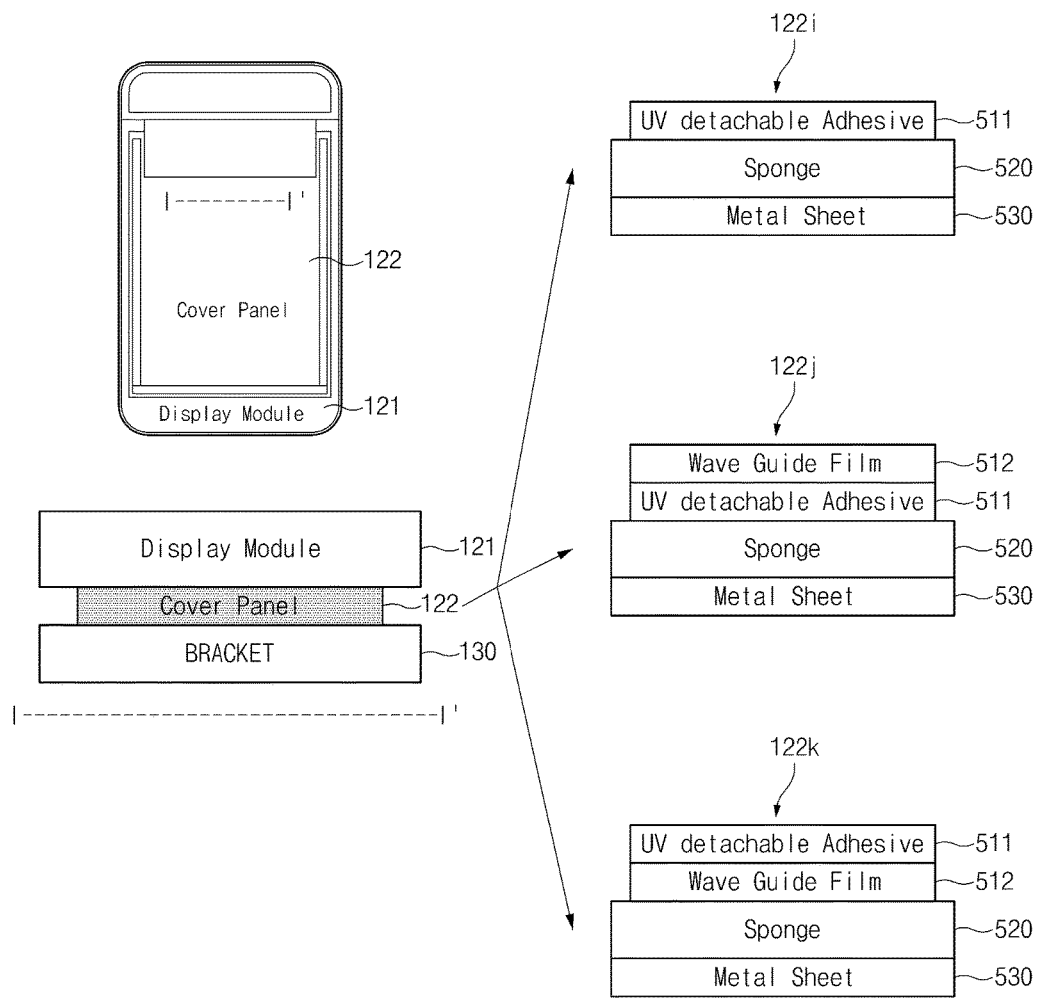

FIG. 5 illustrates sectional views of cover panels in which adhesive members having a UV reaction characteristic and having no base material layer are stacked, according to various example embodiments.

Referring to FIG. 5, the cover panel 122 may be attached to the rear surface of the display module 121. In the sectional view taken along line I-I', the cover panel 122 may be interposed between the display module 121 (e.g., the display panel) and the bracket 130. The cover panel 122 may have the form in which an adhesive member/layer/film 511 having a UV reaction characteristic, an intermediate member/layer/film 520, and a metal sheet/film 530 are sequentially stacked. Differently form the cover panel 122 of FIG. 4, the cover panel 122 of FIG. 5 may be implemented in a form that a single adhesive layer or the combination of a guide film layer and an adhesive layer is formed on the intermediate member 520.

According to various example embodiments, the adhesive member 511 of the cover panel 122 may be implemented with a material having adhesive force which is reduced or canceled out in the case that UV light is irradiated onto the adhesive member 511.

According to a first example embodiment, a cover panel 122i may include the adhesive member 511 having a UV reaction characteristic, which is provided on a surface of the cover panel 122i making contact with the display module 121. In the case that a user attempts to, for a re-bonding work, separate the cover panel 122i from the display module 121 in the state that the cover panel 122i is bonded to the display module 121, the user may separate the cover panel 122i from the display module 121 by irradiating UV light having a specified wavelength onto the adhesive member 511.

According to various example embodiments, the display module 121 may have a specified pattern on the lower end (a surface facing the cover panel 122i) thereof. The light incident to the side surface of the cover panel 122i may be uniformly transmitted throughout the entire area of the adhesive member 511, due to the specified pattern.

According to a second example embodiment, a cover panel 122j may further include a guide film layer (e.g., a wave guide film) 512 provided on the adhesive member 511 in addition to the elements of the cover panel 122i according to the first example embodiment. The guide film layer 512 may uniformly transmit light throughout the entire area of the adhesive member 511 by reflecting and/or guiding the light incident to the side surface of the cover panel 122j.

According to a third example embodiment, a cover panel 122k may include the guide film layer 512 provided under the adhesive member 511, differently from the cover panel 122j according to the second example embodiment. According to various example embodiments, the adhesive member 511 may be bonded to the intermediate member 520 through an additional adhesive layer (not illustrated) interposed between the guide film layer 512 and the intermediate member/layer/film 520.

Figure 6:
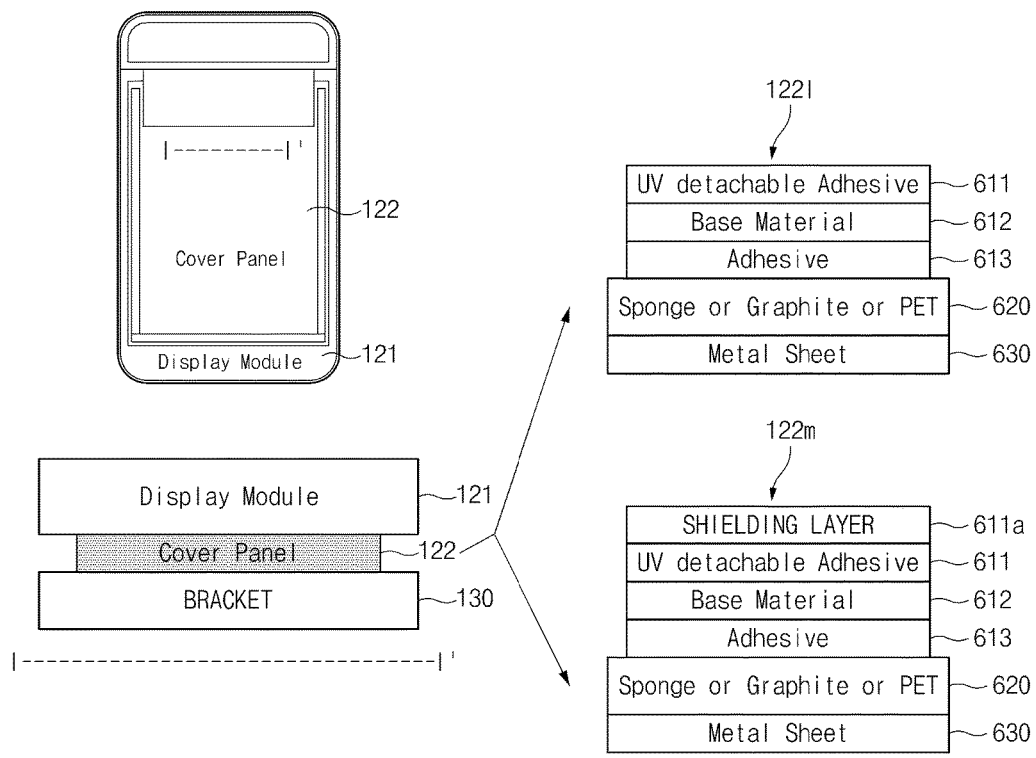

FIG. 6 illustrates sectional views of cover panels having base material layers having a light transmittance, according to various example embodiments.

Referring to FIG. 6, the cover panel 122 may be attached to the rear surface of the display module 121. In the sectional view taken along line I-I', the cover panel 122 may be interposed between the display module 121 (e.g., the display panel) and the bracket 130. The cover panel 122 may have the form in which a first adhesive layer (e.g., a UV reaction layer) 611, a base material layer 612 having an excellent light transmittance, a second adhesive layer 613, an intermediate member/layer/film 620, and a metal sheet 630 are sequentially stacked.

The first adhesive layer 611, the base material layer 612, and the second adhesive layer 613 may have the form of a double-sided tape. The first adhesive layer 611 may be attached to the display module 121, and the second adhesive layer 613 may be attached to the intermediate member/layer/film 620.

According to various example embodiments, the first adhesive layer 611 of the cover panel 122 may be implemented with a material having adhesive force which is reduced or canceled out in the case that UV light is irradiated onto the first adhesive layer 411.

According to a first example embodiment, a cover panel 122l may include the base material layer 612 which has an excellent light transmittance, under the first adhesive layer 611 having the UV reaction characteristic. In the case that a user attempts to, for a re-bonding work, separate the cover panel 122l from the display module 121 in the state that the cover panel 122l is bonded to the display module 121, the user may separate the cover panel 122l from the display module 121 by irradiating UV light onto the rear surface of the cover panel 122l. As the UV light is irradiated onto the rear surface of the cover panel 122l instead of the side surface of the cover panel 122l, the UV light may be efficiently transmitted to the first adhesive layer 611 having the UV reaction characteristic. The UV light may be irradiated onto the rear surface of the cover panel 122l in the state that the intermediate member/film/layer 620 and the metal sheet 630 are removed from the cover panel 122l.

According to a second example embodiment, a cover panel 122m may further include a shielding layer 611a provided on the first adhesive layer 611 in addition to the elements of the cover panel 122l according to the first example embodiment. According to various example embodiments, the shielding layer 611a may be bonded to the display module 121 through an additional adhesive layer (not illustrated) between the display module 121 and the shielding layer 611*a*.

The shielding layer 611*a* may prevent UV light, which is irradiated onto the rear surface of the cover panel 122*m*, from affecting the display module 121 after the UV light passes through the first adhesive layer 611. According to various example embodiments, the shielding layer 611*a* may prevent/reduce light, which is emitted from the display module 121, from affecting the first adhesive layer 611.

Figure 7:
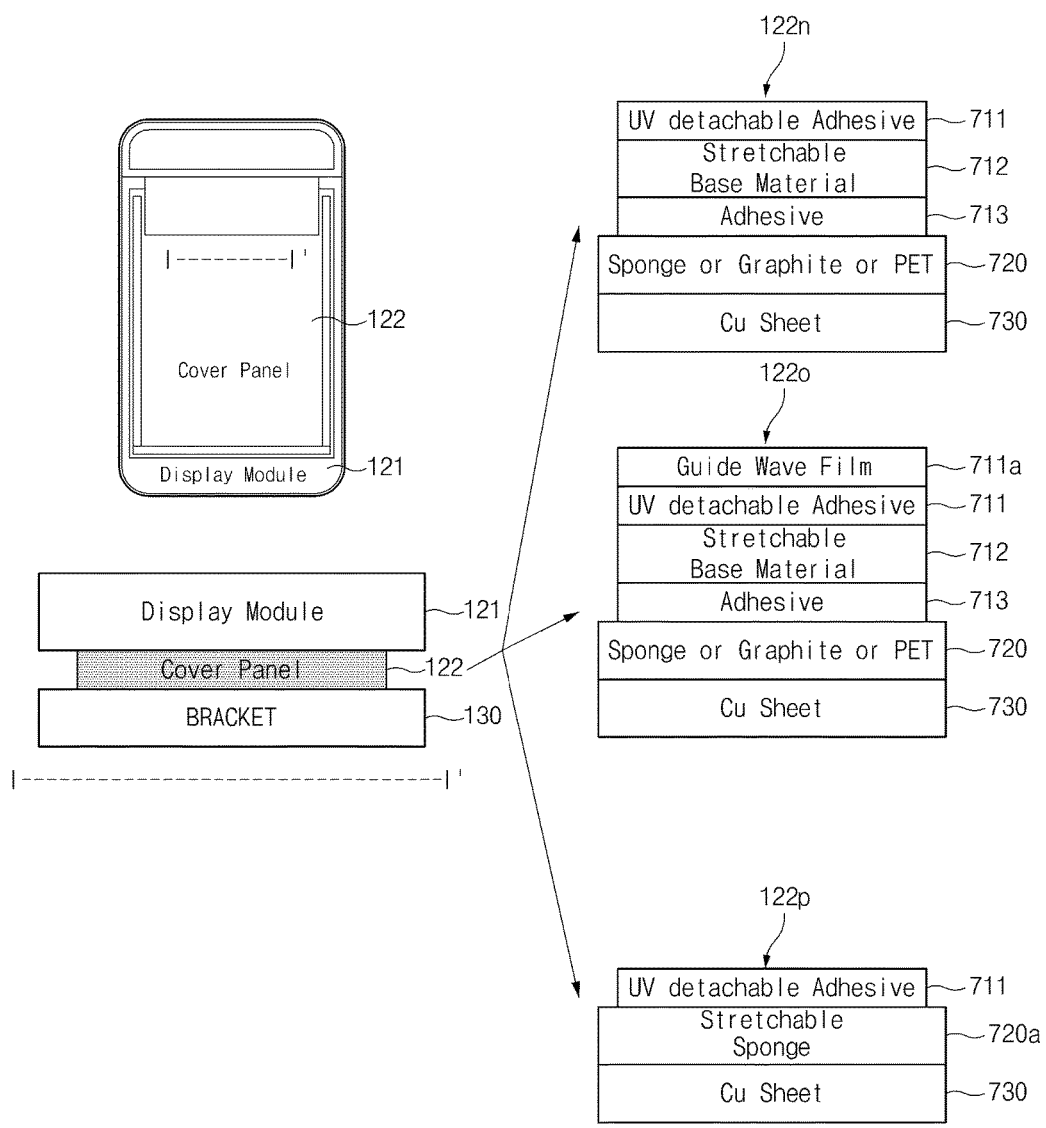

FIG. 7 illustrates sectional views of cover panels which are detachable by force or light applied to the cover panels from the outside, according to various example embodiments.

Referring to FIG. 7, according to a first example embodiment, a cover panel 122*n* may include a first adhesive layer 711 having a UV reaction characteristic, which is provided on a surface of the cover panel 122*n* making contact with the display module 121. In addition, cover panels 122*n* and 122*o* may include base material layers 712 which are stretchable by external force. A second adhesive layer 713, an intermediate member/film/layer 720, and a metal sheet 730 are sequentially stacked under the base material layer 712.

In the case that a user attempts to, for a re-bonding work, separate the cover panel 122*n* from the display module 121 in the state that the cover panel 122*n* is bonded to the display module 121, the user may separate a portion (e.g., a side-edge of the cover panel 122*n*) of the cover panel 122*n* from the display module 121 by irradiating UV light having a specified wavelength onto the first adhesive layer 711. Thereafter, the user may perform a work of separating the cover panel 122*n* from the display module 121 by applying force to the base material layer 712 outwardly from the base material layer 712 in the state that the user holds the base material layer 712 (or the entire portion of the first adhesive layer 711, the base material layer 712, and the second adhesive layer 713).

According to a second example embodiment, a cover panel 122*o* may further include a guide film layer 711*a*, differently from the cover panel 122*n* according to the first example embodiment. The guide film layer 711*a* may uniformly transmit light throughout the entire area of the first adhesive layer 711 by reflecting and/or guiding the light incident to the side surface of the cover panel 122*o*.

According to a third example embodiment, a cover panel 122*p* may include the first adhesive layer 711, which is formed in a single adhesive layer, stacked on an intermediate member/film/layer 720*a*, differently from that according to the first example embodiment or the second example embodiment. In addition, the intermediate member 720*a* may have the form stretchable by external force. A user may separate the cover panel 122*p* from the display module 121 by irradiating UV light onto the first adhesive layer 711 and/or by applying force outwardly from the intermediate member 720*a*.

Figure 8:
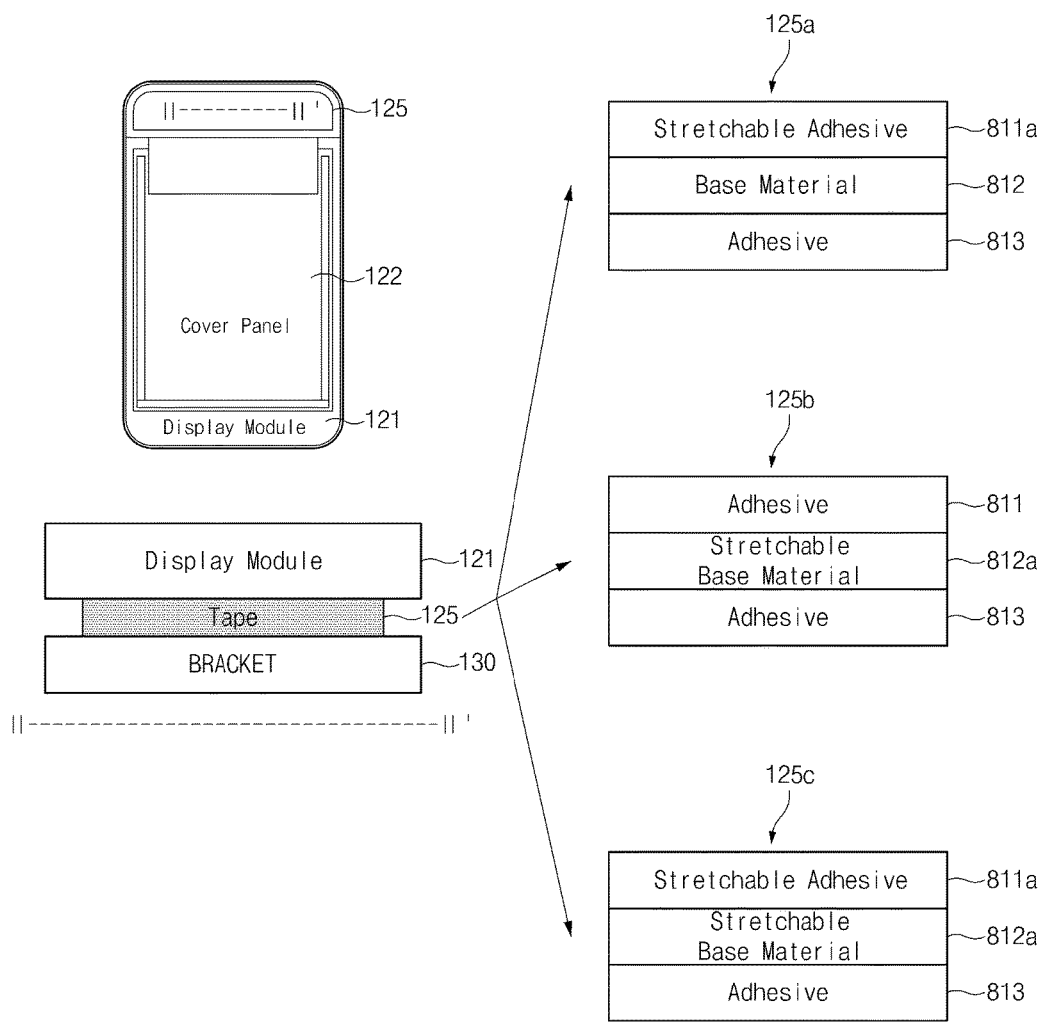
FIGS. 8 to 10 illustrate sectional views of adhesive members provided at edges of a display module, according to various embodiments.
Figure 9:
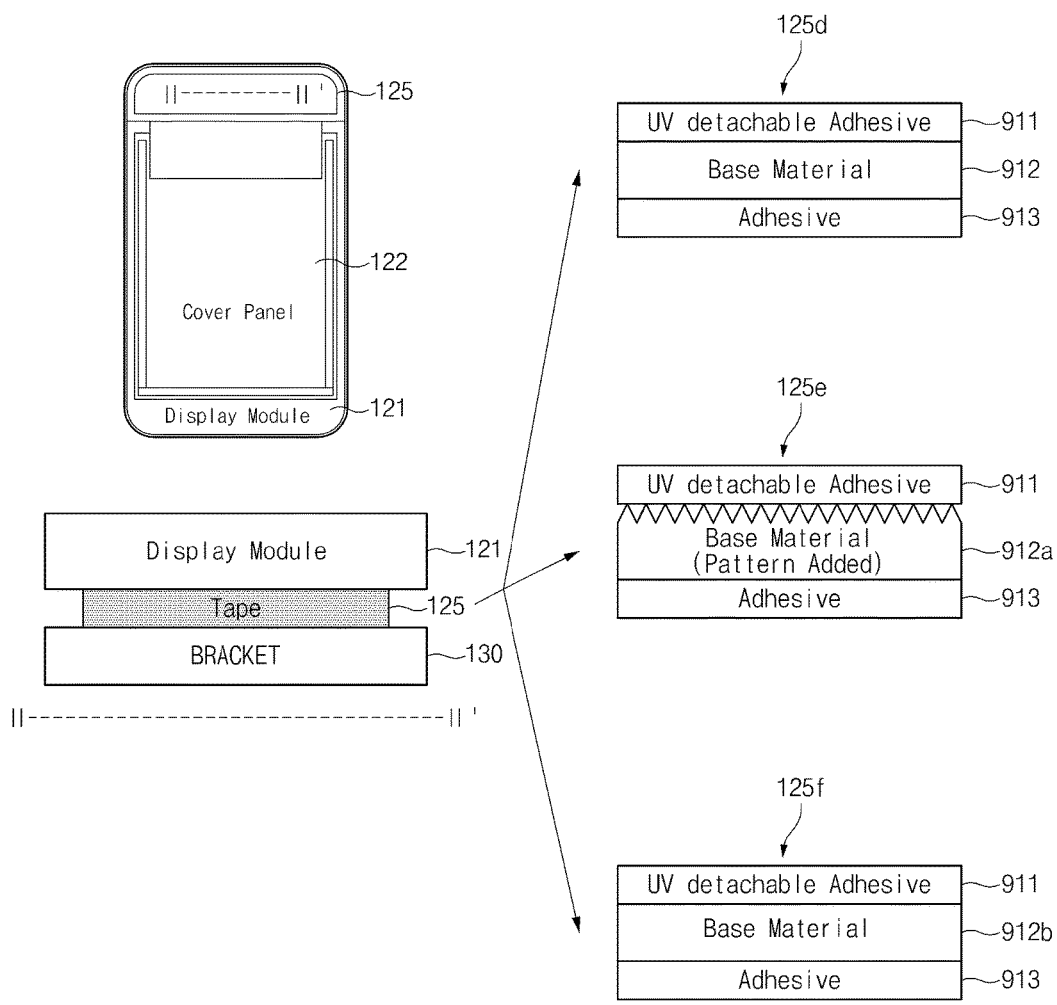
Figure 10:
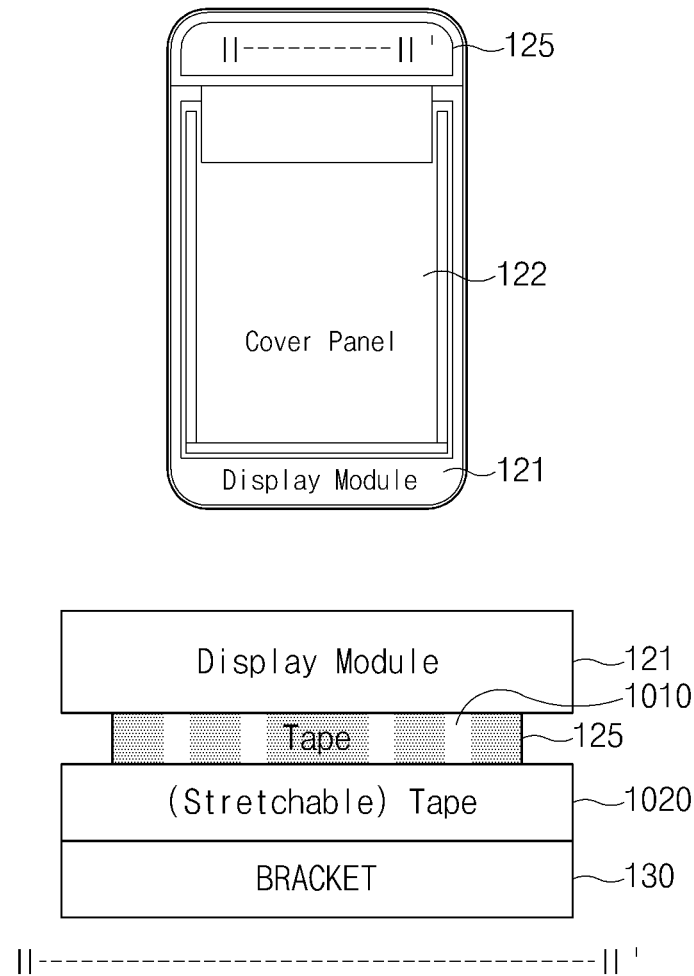

FIGS. 8 to 10 illustrate sectional views of adhesive members provided at edges of a display module, according to various example embodiments.

The display module 121 may be fixed to the bracket 130 through an adhesive member/film 125 at a rear surface of an edge (e.g., the non-active area of the display panel or at an area for disposing the window cover (window panel) of the display module 121). A cover panel need not be additionally interposed between the display module 121 and the bracket 130, unlike FIGS. 2 to 7. The adhesive member/film 125 may be implemented in the form of a double-sided tape including multiple layers, in certain example embodiments.

According to various example embodiments, the adhesive force of the adhesive member/film 125 may be weakened or canceled out due to force applied to the adhesive member 125 from the outside or light incident to the adhesive member 125 from the outside. In this case, the display module 121 may be separated from the bracket 130 without significant adhesive residues remaining on the display module 121.

FIG. 8 illustrates sectional views of adhesive members provided in the form of a double-sided tape that is stretchable according to various example embodiments.

Referring to FIG. 8, in sectional views taken along line II-II', the adhesive member 125 may be attached between the rear surface of the display module 121 and the bracket 130. The adhesive member/film 125 may have the form in which a first adhesive layer 811 or 811*a*, a base material layer 812 or 812*a*, and a second adhesive layer 813 are sequentially stacked.

The first adhesive layer 811 or 811*a*, the base material layer 812 or 812*a*, and the second adhesive layer 813 may be provided in the form of a double-sided tape. The first adhesive layer 811 or 811*a* may be attached to the display module 121, and the second adhesive layer 813 may be attached to the bracket 130.

According to various example embodiments, at least a portion of the first adhesive layer 811 or 811*a* and/or the base material layer 812 or 812*a* of the adhesive member 125 may be implemented in the form stretched by force applied from the outside. In the case that force is applied in an outward direction perpendicular to the direction of stacking the first adhesive layer 811*a* or the base material layer 812*a*, the adhesive force of the adhesive member 125 may be lowered or canceled out. In this case, the display module 121 may be separated from the bracket 130.

According to a first example embodiment, a first adhesive member 125*a* may have the first adhesive layer 811*a*, which is stretchable by external force, and the base material layer 812 and the second adhesive layer 813 may have non-stretchable characteristics. For example, the first adhesive layer 811*a* may be implemented with a urethane-based or epoxy-based material rather than an acryl-based material.

In the case that a user attempts to, for a re-bonding work, separate the display module 121 from the bracket 130 in the state that the display module 121 is bonded to the bracket 130, the user applies force of drawing the base material layer 812 (or the whole film/layer of the first adhesive layer 811*a*, the base material layer 812, and the second adhesive layer 813) in a side-surface direction (a direction perpendicular to a stack direction of the first adhesive member 125*a* or a direction perpendicular to a display surface) of the electronic device, thereby weakening or canceling out the adhesive force of the first adhesive layer 811*a*.

According to a second example embodiment, an adhesive member 125*b* may have the base material layer 812*a*, which is stretchable by external force, and the first adhesive layer 811 and the second adhesive layer 813 may have non-stretchable characteristics. For example, the base material layer 812*a* may be implemented with a material at least partially mixed with a rubber-based material or a urethane-based material.

In the case that a user attempts to, for a re-bonding work, separate the display module 121 from the bracket 130 in the state that the display module 121 is bonded to the bracket 130, the user applies force of drawing the base material layer 812*a* (or the whole layer of the first adhesive layer 811, the base material layer 812a, and the second adhesive layer 813) in a side-surface direction (a direction perpendicular to a stack direction of the adhesive member 125b), thereby weakening or canceling out the adhesive force of the first adhesive layer 811.

According to a third example embodiment, an adhesive member 125c may have the first adhesive layer 811a and the base material layer 812a, which are both stretchable by external force, and the second adhesive layer 813 may have a non-stretchable characteristic. The manner of separating the display module 121 from the bracket 130 may be identical to or similar to that of the first example embodiment or the second example embodiment.

FIG. 9 illustrates sectional views of adhesive members having a UV reaction characteristic, according to various example embodiments.

Referring to FIG. 9, in sectional views taken along line II-II', the adhesive member 125 may be attached between the rear surface of the display module 121 and the bracket 130. The adhesive member 125 may have a form in which a first adhesive layer (or a UV reaction layer) 911, a base material layer 912, 912a, or 912b, and a second adhesive layer 913 are sequentially stacked.

The first adhesive layer 911, the base material layer 912, 912a or 912b, and the second adhesive layer 913 may have the form of a double-sided tape. The first adhesive layer 911 may be attached to the display module 121, and the second adhesive layer 913 may be attached to the bracket 130.

According to various example embodiments, the first adhesive layer 911 of the adhesive member 125 may be implemented with a material having adhesive force which is reduced or canceled out in the case that UV light is irradiated onto the first adhesive layer 911. In the case that the first adhesive layer 911 has a UV reaction characteristic, the contact between the first adhesive layer 911 and an FPCB (e.g., chip on plastic (COP) or a chip on film (COF)) disposed on the rear surface of the display module 122 is restricted, so the failure occurring in the manufacturing process of the electronic device may be reduced.

According to the first example embodiment, an adhesive member 125d may include the first adhesive layer 911 having a UV reaction characteristic, which is provided on a surface of the adhesive member 125d making contact with the display module 121. In the case that a user attempts to, for a re-bonding work, separate the display module 121 from the bracket 130 in the state that the display module 121 is bonded to the bracket 130, the user may irradiate UV light having the specified wavelength onto the first adhesive layer 911 such that the adhesive force of the first adhesive layer 911 may be weakened or canceled out. Accordingly, the display module 121 may be separated from the bracket 130.

According to a second example embodiment, an adhesive member 125e may include the base material layer 912a having a specified pattern formed on only one surface of the base material layer 912a. The light incident to the side surface of the adhesive member 125e may be uniformly transmitted throughout the entire area of the first adhesive layer 911, due to the specified pattern which may be formed by embossing, etching, or the like.

According to a third example embodiment, an adhesive member 125f may include the base material layer 912b having an excellent light transmittance. In this case, UV light may be incident to the rear surface of the display module 121 to separate the display module 121 from the adhesive member 125f. The bracket 130 may be primarily separated from the adhesive member 125f and the display module 121 may be separated from the adhesive member 125f as the UV light is incident to the adhesive member 125f. As the UV light is irradiated onto the rear surface of the display module 121 instead of the side surface of the adhesive member 125f, the UV light may be efficiently transmitted to the first adhesive layer 911 having the UV reaction characteristic.

FIG. 10 illustrates sectional views of adhesive members stacked on a sub-adhesive layer, according to various example embodiments.

Referring to FIG. 10, in sectional views taken along line II-II', the adhesive member 125 may be attached between the rear surface of the display module 121 and the bracket 130. According to various example embodiments, the adhesive member/film 125 may include one or more holes/apertures 1010 for parts mounted thereon. A sub-adhesive layer 1020 may be interposed between the adhesive member/film 125 and the bracket 130. The sub-adhesive layer 1020 may prevent/reduce the adhesive member 125 including the one or more holes 1010 from being torn or broken in the process of stretching the adhesive member 125 including the one or more holes 1010. An additional stretchable sub-adhesive layer may be interposed between the adhesive member 125 and the bracket 130.

In the case that a user applies force to the sub-adhesive layer 1020 outwardly from the sub-adhesive layer 1020 to separate the display module 121 from the bracket 130, the adhesive member 125 may be stretched together with the sub-adhesive layer 1020.

Figure 11:
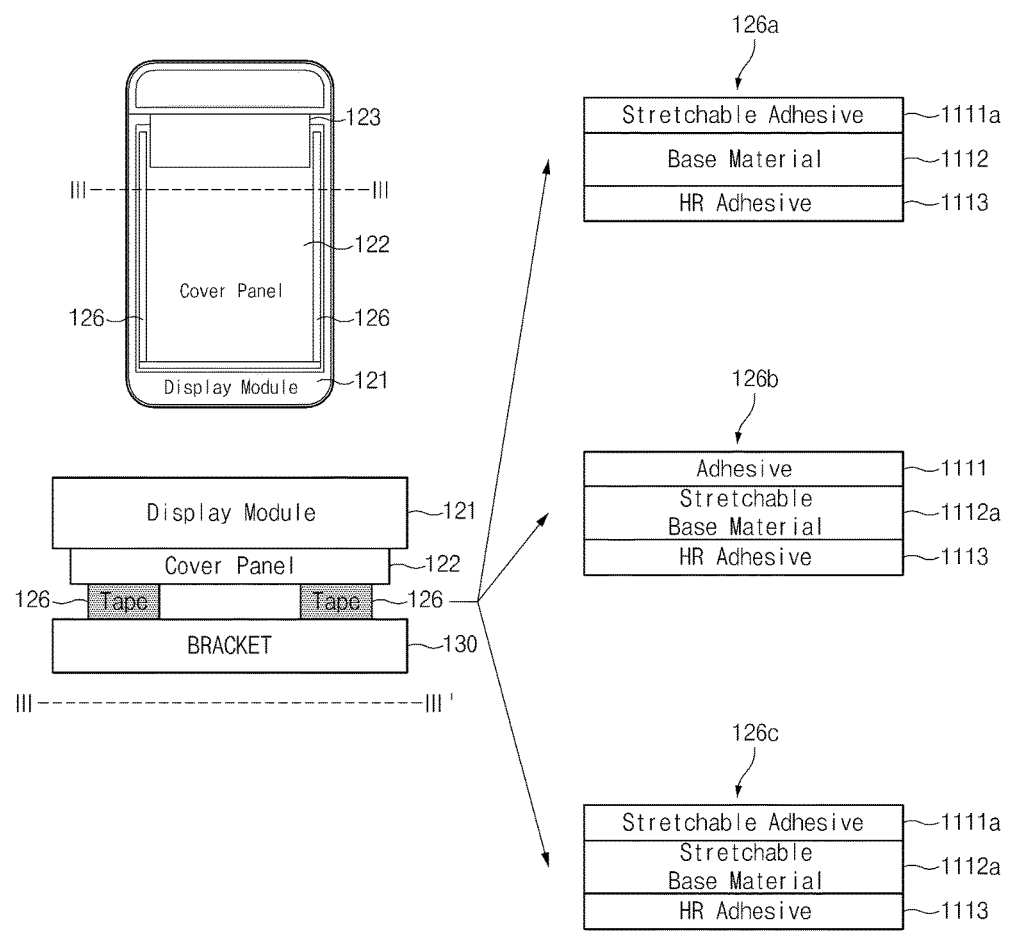
FIGS. 11 and 12 illustrate sectional views of adhesive members between the cover panel and the bracket, according to various embodiments.
Figure 12:
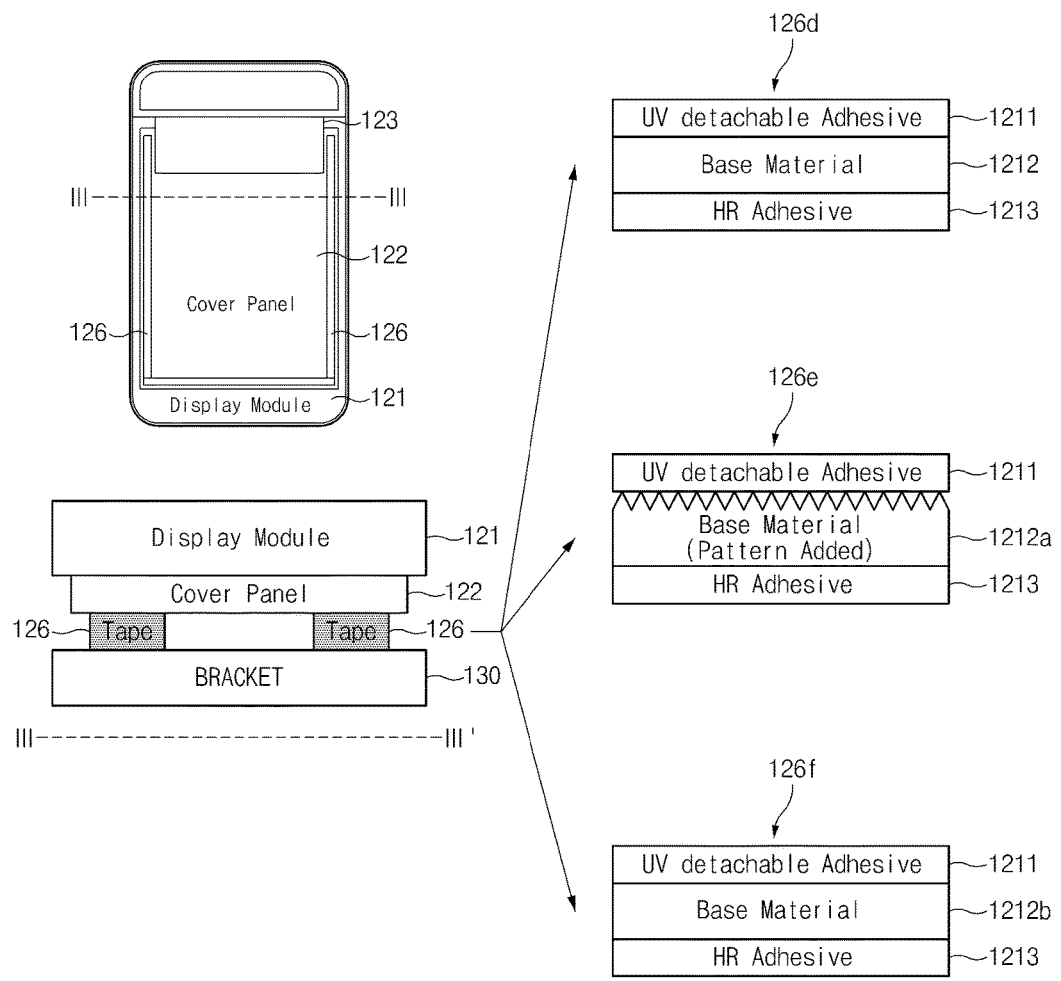

FIGS. 11 and 12 illustrate sectional views of adhesive members between the cover panel and the bracket, according to various example embodiments.

An adhesive member/film 126 having a band shape may be disposed at edge areas of the cover panel 122 to be bonded to the bracket 130. According to an example embodiment, the adhesive member/film 126 may be attached to remaining portion of the edge areas of the cover panel 122 except an area in which the FPCB 123 is disposed. The adhesive member/film 126 may be implemented in the form of a double-sided tape including multiple layers.

According to various example embodiments, the adhesive member/film 126 may include a heat reacted (HR) adhesive formed on a surface facing the bracket 130. Heat may be applied to the adhesive member 126 for the re-bonding work of the cover panel 122, and the adhesive member 126 and the bracket 130 may be separated from each other. Thereafter, the adhesive member 126 may be separated from the cover panel 122 through an additional process. According to various example embodiments, the adhesive force of the adhesive member 126 may be weakened or canceled out due to force applied to the adhesive member 126 from the outside or light incident to the adhesive member 126 from the outside.

FIG. 11 illustrates sectional views of adhesive members provided in the form of a double-sided tape stretchable according to various example embodiments.

Referring to FIG. 11, in sectional views taken along line III-III' the adhesive member/film 126 may be attached between the cover panel 122 and the bracket 130. The adhesive member 126 may have the form in which a first adhesive layer 1111 or 1111a, a base material layer 1112 or 1112a, and a second adhesive layer (or a heat reacted (HR) adhesive) 1113 are sequentially stacked.

The first adhesive layer 1111 or 1111a, the base material layer 1112 or 1112a, and the second adhesive layer 1113 may be provided in the form of a double-sided tape. The first adhesive layer 1111 or 1111*a* may be attached to the cover panel 122, and the second adhesive layer 1113 may be attached to the bracket 130.

According to various example embodiments, at least a portion of the first adhesive layer 1111 or 1111*a* and/or the base material layer 1112 or 1112*a* of the adhesive member 126 may be implemented in the form stretched by force applied from the outside. In the case that force is applied in an outward direction perpendicular to the direction of stacking the first adhesive layer 1111*a* or the base material layer 1112*a*, the adhesive force of the adhesive member 126 may be lowered or canceled out. In this case, the cover panel 122 may be separated from the display module 120.

According to various example embodiments, the second adhesive layer 1113 may be implemented with a heat reacted material. For example, the adhesive force of the second adhesive layer 1113 may be weakened or canceled out at a specified temperature or more. In this case, a user may primarily separate the adhesive member 126 from the bracket 130 by applying heat to the second adhesive layer 1113. Thereafter, the user may separate the adhesive member 126 from the cover panel 122 by using the stretching characteristic of the first adhesive layer 1111*a* or the base material layer 1112*a*

According to a first example embodiment, a first adhesive member 126*a* may have the first adhesive layer 1111*a*, which is stretchable by external force, and the base material layer 1112 and the second adhesive layer 1113 may have a non-stretchable characteristic. For example, the first adhesive layer 1111*a* may be implemented with a urethane-based or epoxy-based material rather than an acryl-based material.

In the case that a user attempts to, for a re-bonding work, separate the cover panel 122 from the bracket 130 in the state that the cover panel 122 is bonded to the bracket 130, the user applies force of drawing the base material layer 1112 (or the whole layer of the first adhesive layer 1111*a*, the base material layer 1112, and the second adhesive layer 1113) in a side-surface direction (a direction perpendicular to a stack direction of the first adhesive member 126*a* or a direction perpendicular to a display surface) of the electronic device, thereby weakening or canceling out the adhesive force of the first adhesive layer 1111*a*.

According to a second example embodiment, an adhesive member 126*b* may have the base material layer 1112*a*, which is stretchable by external force, and the first adhesive layer 1111 and the second adhesive layer 1113 may have a non-stretchable characteristic. For example, the base material layer 1112*a* may be implemented with a material at least partially mixed with a rubber-based material or a urethane-based material.

In the case that a user attempts to, for a re-bonding work, separate the cover panel 122 from the bracket 130 in the state that the cover panel 122 is bonded to the bracket 130, the user applies force of drawing the base material layer 1112*a* (or the whole layer of the first adhesive layer 1111, the base material layer 1112*a*, and the second adhesive layer 1113) in a side-surface direction (a direction perpendicular to a stack direction of the adhesive member 126*b*), thereby weakening or canceling out the adhesive force of the first adhesive layer 1111.

According to a third example embodiment, an adhesive member 126*c* may have the first adhesive layer 1111*a* and the base material layer 1112*a*, which are stretchable by external force, and the second adhesive layer 1113 may have a non-stretchable characteristic. The manner of separating the cover panel 122 from the bracket 130 may be identical to or similar to that of the first example embodiment or the second example embodiment.

FIG. 12 illustrates sectional views of adhesive members having a UV reaction characteristic, according to various example embodiments.

Referring to FIG. 12, in sectional views taken along line III-III', the adhesive member 126 may be attached between the cover panel 122 and the bracket 130. The adhesive member 126 may have the form in which a first adhesive layer 1211, a base material layer 1212, 1212*a*, or 1212*b*, and a second adhesive layer 1213 (or a heat reacted adhesive layer) are sequentially stacked.

The first adhesive layer 1211, the base material layers 1212, 1212*a*, or 1212*b*, and the second adhesive layer 1213 (or heat reacted adhesive layer) may have the form of a double-sided tape. The first adhesive layer 1211 may be attached to the cover panel 122, and the second adhesive layer 1213 may be attached to the bracket 130.

According to various example embodiments, the first adhesive layer 1211 of the adhesive member 126 may be implemented with a material having adhesive force which is reduced or canceled out in the case that UV light is irradiated onto the first adhesive layer 1211.

According to various example embodiment, the second adhesive layer 1213 may be implemented with a heat reacted material. For example, the adhesive force of the second adhesive layer 1213 may be weakened or cancelled out at a specified temperature or more. In this case, a user may apply heat to the second adhesive layer 1213 to primarily separate the adhesive member 126 from the bracket 130 and then to separate the adhesive member 126 from the cover panel 122 using a UV reaction characteristic of the first adhesive layer 1211 or the base material layer 1212*a*.

According to a first example embodiment, an adhesive member 126*d* may include the first adhesive layer 1211 having a UV reaction characteristic, which is provided on a surface of the adhesive member 126*d* making contact with the cover panel 122. In the case that a user attempts to, for the re-bonding work, separate the cover panel 122 from the display module 121 in the state that the cover panel 122 is bonded to the display module 121, the user may weaken or cancel out the adhesive force of the first adhesive layer 1211 by irradiating UV light having a specified wavelength onto the first adhesive layer 141. Accordingly, the cover panel 122 may be separated from the bracket 130.

According to a second example embodiment, an adhesive member 126*e* may include the base material layer 1212*a* having a specified pattern formed on a surface thereof which faces the first adhesive layer 1211. The light incident to the side surface of the adhesive member 126*d* may be uniformly transmitted throughout the entire area of the first adhesive layer 1211, due to the pattern.

According to a third example embodiment, an adhesive member 126*f* may include the base material layer 1212*b* having an excellent light transmittance. In this case, the UV light may be incident to the rear surface of the cover panel 122 to separate the cover panel 122 from the bracket 130. As the UV light is irradiated onto the rear surface of the cover panel 122 instead of the side surface of the adhesive member 126*f*, the UV light may be efficiently transmitted to the first adhesive layer 1211 having the UV reaction characteristic.

Figure 13:
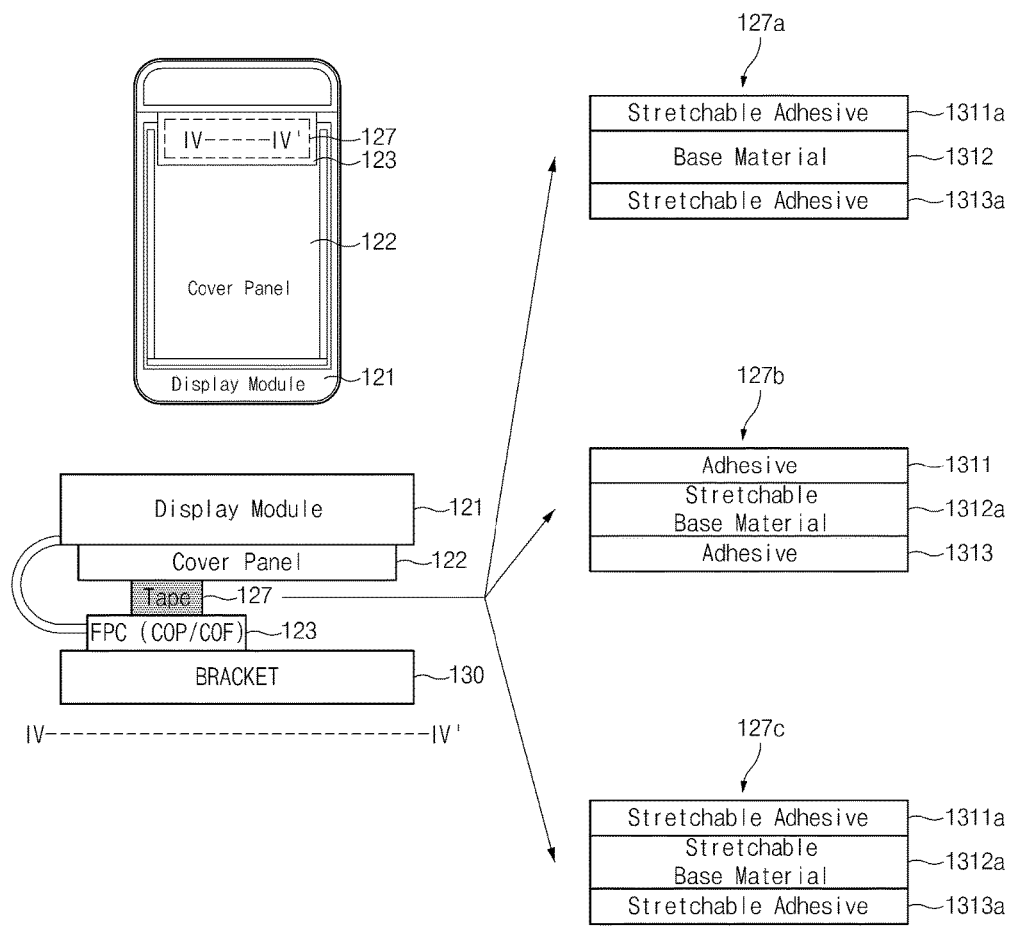
FIGS. 13, 14 and 15 illustrate sectional views of an adhesive member between a cover panel and an FPCB, according to various embodiments.
Figure 14:
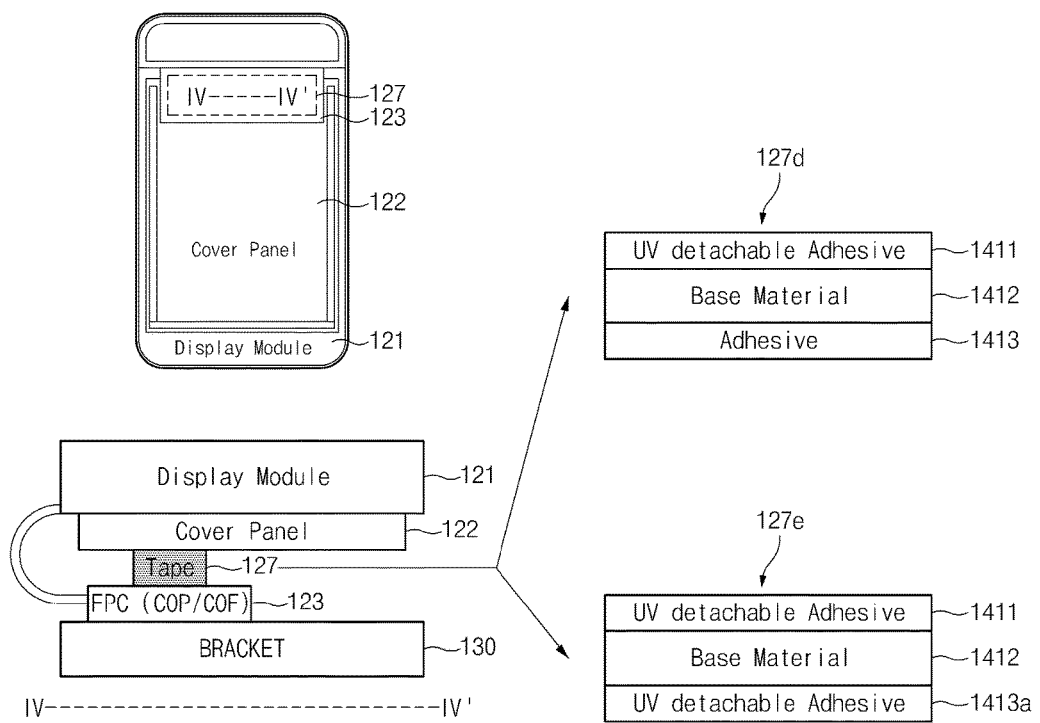
Figure 15:
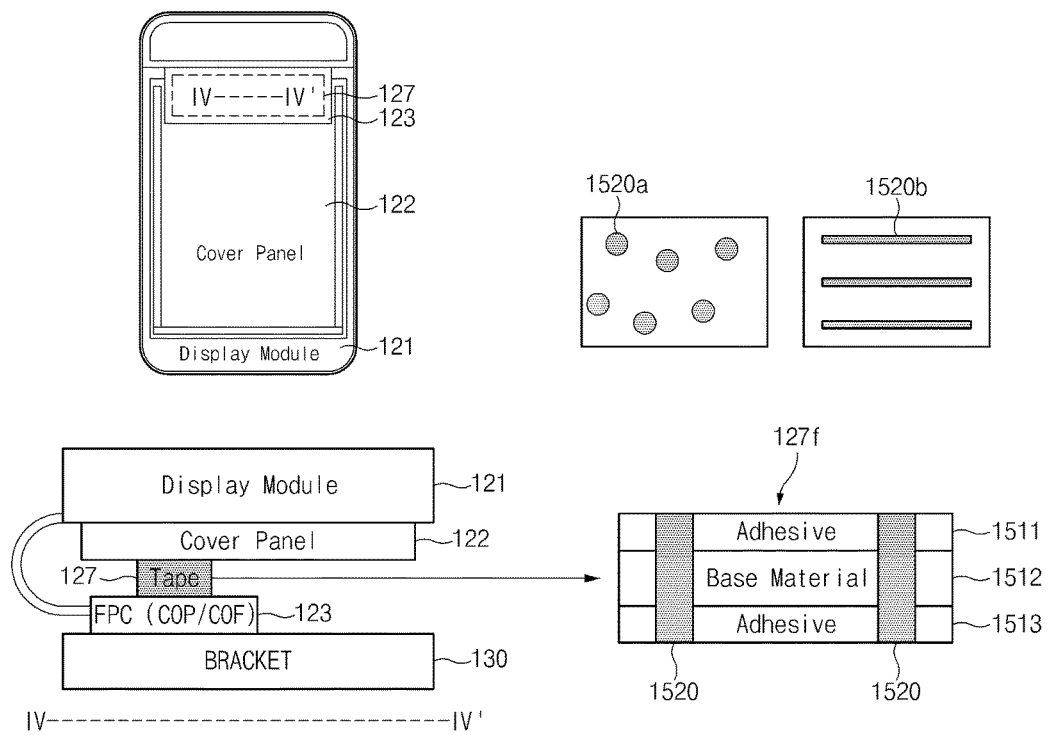

FIGS. 13 to 15 illustrate sectional views of an adhesive member between a cover panel and an FPCB, according to various example embodiments.

An FPCB 123 may be disposed on the rear surface of the display module 121. The FPCB 123 may have a chip and/or a circuit mounted thereon to process an electrical signal(s)

generated from a display panel and/or a touch panel provided inside the display module 121.

According to various example embodiments, the FPCB 123 may be interposed between the cover panel 122 attached to the rear surface of the display module 121 and the bracket 130. The FPCB 123 may be attached to the cover panel 122 through an adhesive member/film 127. The adhesive member 127 may be implemented in the form of a double-sided tape including multiple layers.

According to various example embodiments, the adhesive force of the adhesive member 127 may be weakened or canceled out due to force applied to the adhesive member 127 from the outside or light incident to the adhesive member 127 from the outside.

FIG. 13 illustrates sectional views of adhesive members provided in the form of a double-sided tape stretchable according to various example embodiments.

Referring to FIG. 13, in sectional views taken along line IV-IV', an adhesive member/film 127 may be attached between the cover panel 122 and the FPCB 123. The adhesive member 127 may have the form in which a first adhesive layer 1311 or 1311a, a base material layer 1312 or 1312a, and a second adhesive layer 1313 or 1313a are sequentially stacked.

The first adhesive layer 1311 or 1311a, the base material layer 1312 or 1312a, and the second adhesive layer 1313 or 1313a may be provided in the form of a double-sided tape. The first adhesive layer 1311 or 1311a may be attached to the cover panel 122, and the second adhesive layer 1313 or 1313a may be attached to the FPCB 123.

According to various example embodiments, at least a portion of the first adhesive layer 1311 or 1311a, the base material layer 1312 or 1312a or the second adhesive layers 1313 or 1313a of the adhesive member 127 may be implemented in the form stretched by force applied from the outside. In the case that force is applied in an outward direction perpendicular to the direction of stacking the first adhesive layer 1311a, the base material layer 1112a, or the second adhesive layer 1313a, the adhesive force of the adhesive member 127 may be weakened or canceled out. In this case, the cover panel 122 may be separated from the FPCB 123. Since the FPCB 123 may be weak against external force, the stretching characteristic may be applied even to the second adhesive layer 1313a.

According to a first example embodiment, a first adhesive member 127a may have the first adhesive layer 1311a and the second adhesive layer 1313a, which are stretchable by external force, and the base material layer 1312 may have a non-stretchable characteristic. For example, the first adhesive layer 1311a and the second adhesive layer 1313a may be implemented with a urethane-based or epoxy-based material rather than an acryl-based material.

In the case that a user attempts to, for a re-bonding work, separate the cover panel 122 from the FPCB 123 in the state that the cover panel 122 is bonded to the FPCB 123, the user applies force of drawing the base material layer 1312 (or the whole layer of the first adhesive layer 1311a, the base material layer 1312, and the second adhesive layer 1313a) in a side-surface direction (a direction perpendicular to the stack direction of the first adhesive member 127a), thereby weakening or canceling out the adhesive force of the first adhesive layer 1311a and the second adhesive layer 1313a.

According to a second example embodiment, an adhesive member 127b may have the base material layer 1312a, which is stretchable by external force, and the first adhesive layer 1311 and the second adhesive layer 1313 may have a non-stretchable characteristic. For example, the base material layer 1312a may be implemented with a material at least partially mixed with a rubber-based material or a urethane-based material.

In the case that a user attempts to separate the cover panel 122 from the FPCB 123 to perform a re-bonding work in the state that the cover panel 122 is bonded to the FPCB 123, the user applies force of drawing the base material layer 1312a (or the whole layer of the first adhesive layer 1311, the base material layer 1312a, and the second adhesive layer 1313) in a side-surface direction (a direction perpendicular to the stack direction of the adhesive member 127b), thereby weakening or canceling out the adhesive force of the first adhesive layer 1311 and the second adhesive layer 1313.

According to a third example embodiment, an adhesive member 127c may have the first adhesive layer 1311a, the base material layer 1312a, and the second adhesive layer 1313a may have stretchable characteristics by external force. The manner of separating the cover panel 122 from the bracket 130 may be identical to or similar to that of the first example embodiment or the second example embodiment.

FIG. 14 illustrates sectional views of adhesive members having a UV reaction characteristic, according to various example embodiments.

Referring to FIG. 14, in sectional views taken along line IV-IV', the adhesive member 127 may be attached between the cover panel 122 and the FPCB 123. The adhesive member 127 may have the form in which a first adhesive layer 1411, a base material layer 1412, and a second adhesive layer 1413 or 1413a are sequentially stacked.

The first adhesive layer 1411, the base material layer 1412, and the second adhesive layer 1413 or 1413a may have the forms of a double-sided tape. The first adhesive layer 1411 may be attached to the cover panel 122, and the second adhesive layer 1413 or 1413a may be attached to the FPCB 123.

According to various example embodiments, the first adhesive layer 1411 or the second adhesive layer 1413a of the adhesive member 127 may be implemented with a material having adhesive force which is weakened or canceled out in the case that UV light is irradiated onto the first adhesive layer 1411 or the second adhesive layer 1413a. In this case, the cover panel 122 may be separated from the FPCB 123.

According to a first example embodiment, an adhesive member 127d may include the first adhesive layer 1411 having a UV reaction characteristic, which is provided on a surface of the adhesive member 127d making contact with the display module 121. In the case that a user attempts to, for a re-bonding work, separate the cover panel 122 from the FPCB 123 in the state that the cover panel 122 is bonded to the FPCB 123, the user may weaken or cancel out the adhesive force of the first adhesive layer 1411 by irradiating UV light having a specified wavelength onto the first adhesive layer 1411. In this case, the cover panel 122 may be separated from the FPCB 123.

According to a second example embodiment, an adhesive member 127e may include the first adhesive layer 1411 having a UV reaction characteristic, which is provided on a surface of the adhesive member 127e making contact with the cover panel 122, and may include the second adhesive layer 1413a having a UV reaction characteristic, which is provided on a surface of the adhesive member 127e making contact with the FPCB 123. Since the FPCB 123 may be weak against external force, the UV reaction characteristic may be applied even to the second adhesive layer 1413a.

According to various example embodiments, the adhesive member 127d or the adhesive member 127e may be implemented in the form of further including an additional guide film layer (e.g., a wave guide film) or in the form that the base material layer 1412 is replaced with a guide film layer (e.g., a wave guide film). In this case, the guide film layer may reflect or guide light incident to a side surface of the guide film layer such that the light is uniformly transmitted throughout the entire area of the adhesive member 127d or 127e.

FIG. 15 illustrates an adhesive member including a conductor, according to various example embodiments.

Referring to FIG. 15, in a sectional view taken along line IV-IV', the adhesive member 127 may be attached between the cover panel 122 and the FPCB 123. The adhesive member 127 may have the form in which a first adhesive layer 1511, a base material layer 1512, and a second adhesive layer 1513 are sequentially stacked. The first adhesive layer 1511, the base material layer 1512, and the second adhesive layer 1513 may have the forms of a double-sided tape.

According to various example embodiments, the adhesive member 127 may include conductors 1520 to transmit an electrical signal between the cover panel 122 and the FPCB 123. For example, each conductor 1520 may be formed in a circular shape 1520a or a rod shape 1520b.

In the case that the adhesive member 127 includes the conductors 1520, the whole bonding area may be reduced and a work of separating the adhesive member 127 from the cover panel 122 may be easily performed.

Figure 16:
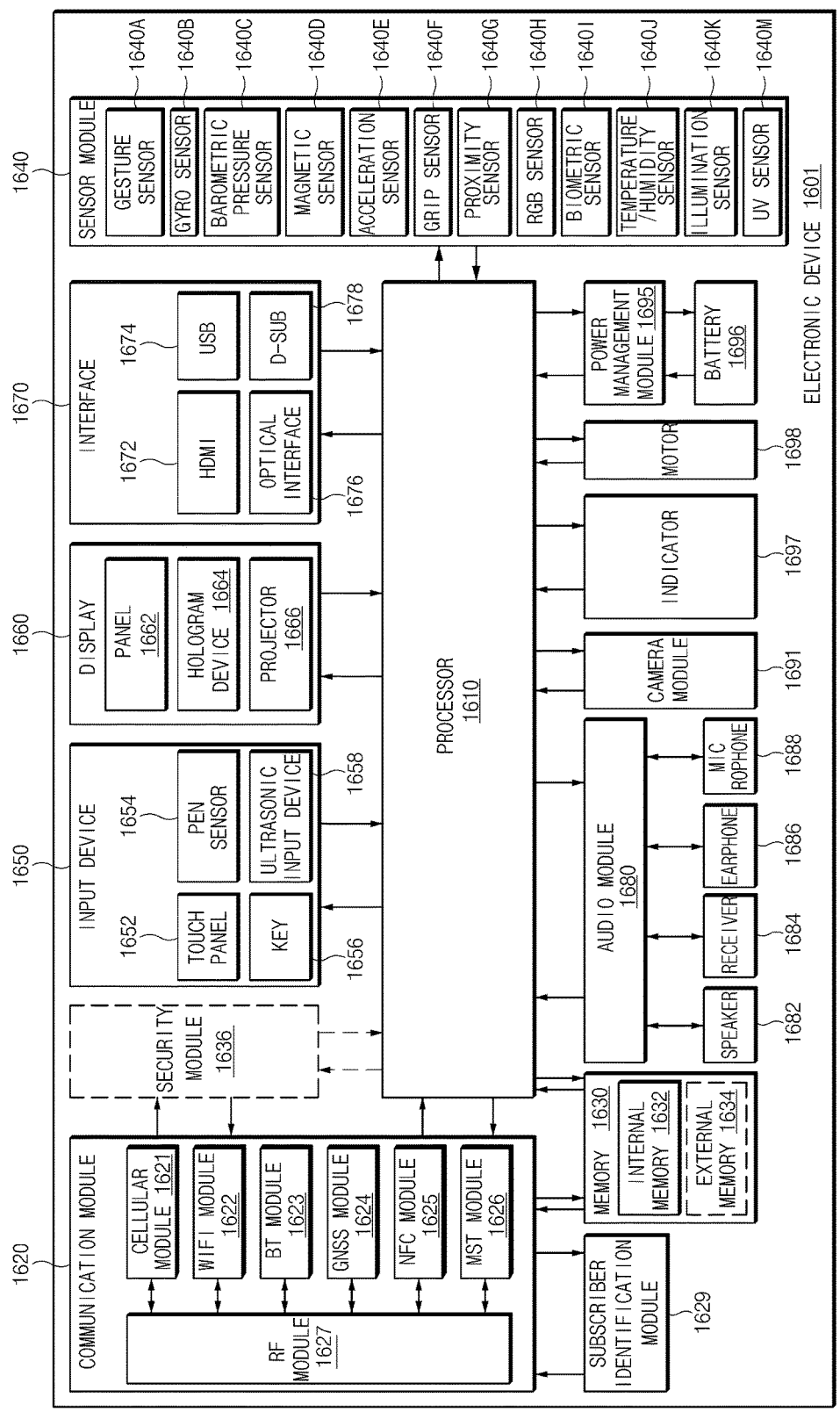
FIG. 16 is a block diagram of an electronic device, according to various embodiments.

FIG. 16 is a block diagram illustrating an electronic device according to an example embodiment of the present disclosure.

Referring to FIG. 16, an electronic device 1601 may include, for example, a part or the entirety of the electronic device 101 illustrated in FIG. 1. The electronic device 1601 may include at least one processor (e.g., AP) 1610, a communication module 1620, a subscriber identification module (SIM) 1629, a memory 1630, a sensor module 1640, an input device 1650, a display 1660, an interface 1670, an audio module 1680, a camera module 1691, a power management module 1695, a battery 1696, an indicator 1697, and a motor 1698.

The processor 1610 may run an operating system or an application program so as to control a plurality of hardware or software elements connected to the processor 1610, and may process various data and perform operations. The processor 1610 may be implemented with, for example, a system on chip (SoC). According to an example embodiment of the present disclosure, the processor 1610 may further include a graphic processing unit (GPU) and/or an image signal processor. The processor 1610 may include at least a portion (e.g., a cellular module 1621) of the elements illustrated in FIG. 16. The processor 1610 may load, on a volatile memory, an instruction or data received from at least one of other elements (e.g., a nonvolatile memory) to process the instruction or data, and may store various data in a nonvolatile memory.

The communication module 1620 may have a configuration that is the same as or similar to that of the communication interface 170 of FIG. 1. The communication module 1620 may include, for example, a cellular module 1621, a Wi-Fi module 1622, a Bluetooth (BT) module 1623, a GNSS module 1624 (e.g., a GPS module, a GLONASS module, a BeiDou module, or a Galileo module), a NFC module 1625, a MST module 1626, and a radio frequency (RF) module 1627.

The cellular module 1621 may provide, for example, a voice call service, a video call service, a text message service, or an Internet service through a communication network. The cellular module 1621 may identify and authenticate the electronic device 1601 in the communication network using the subscriber identification module 1629 (e.g., a SIM card). The cellular module 1621 may perform at least a part of functions that may be provided by the processor 1610. The cellular module 1621 may include a communication processor (CP).

Each of the Wi-Fi module 1622, the Bluetooth module 1623, the GNSS module 1624 and the NFC module 1625 may include, for example, a processor for processing data transmitted/received through the modules. According to some various example embodiments of the present disclosure, at least a part (e.g., two or more) of the cellular module 1621, the Wi-Fi module 1622, the Bluetooth module 1623, the GNSS module 1624, and the NFC module 1625 may be included in a single integrated chip (IC) or IC package.

The RF module 1627 may transmit/receive, for example, communication signals (e.g., RF signals). The RF module 1627 may include, for example, a transceiver, a power amp module (PAM), a frequency filter, a low noise amplifier (LNA), an antenna, or the like. According to another example embodiment of the present disclosure, at least one of the cellular module 1621, the Wi-Fi module 1622, the Bluetooth module 1623, the GNSS module 1624, or the NFC module 1625 may transmit/receive RF signals through a separate RF module.

The SIM 1629 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1630 (e.g., the memory 130) may include, for example, an internal memory 1632 or an external memory 1634. The internal memory 1632 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1634 may include a flash drive such as a compact flash (CF), a secure digital (SD), a Micro-SD, a Mini-SD, an extreme digital (xD), a MultiMediaCard (MMC), a memory stick, or the like. The external memory 1634 may be operatively and/or physically connected to the electronic device 1601 through various interfaces.

The sensor module 1640 may, for example, measure physical quantity or detect an operation state of the electronic device 1601 so as to convert measured or detected information into an electrical signal. The sensor module 1640 may include, for example, at least one of a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor 1640H (e.g., a red/green/blue (RGB) sensor), a biometric sensor 1640I, a temperature/humidity sensor 1640J, an illumination sensor 1640K, or an ultraviolet (UV) sensor 1640M. Additionally or alternatively, the sensor module 1640 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1640 may further include a control circuit for controlling at least one sensor included therein. In some various example embodiments of the present disclosure, the electronic device 1601 may further include a processor configured to control the sensor module 1640 as a part of the processor 1610 or separately, so that the sensor module 1640 is controlled while the processor 1610 is in a sleep state.

The input device 1650 may include, for example, a touch panel 1652, a (digital) pen sensor 1654, a key 1656, or an ultrasonic input device 1658. The touch panel 1652 may employ at least one of capacitive, resistive, infrared, and ultraviolet sensing methods. The touch panel 1652 may further include a control circuit. The touch panel 1652 may further include a tactile layer so as to provide a haptic feedback to a user.

The (digital) pen sensor 1654 may include, for example, a sheet for recognition which is a part of a touch panel or is separate. The key 1656 may include, for example, a physical button, an optical button, or a keypad. The ultrasonic input device 1658 may sense ultrasonic waves generated by an input tool through a microphone 1688 so as to identify data corresponding to the ultrasonic waves sensed.

The display 1660 (e.g., the display 160) may include a panel 1662, a hologram device 1664, or a projector 1666. The panel 1662 may have a configuration that is the same as or similar to that of the display 160 of FIG. 1. The panel 1662 may be, for example, flexible, transparent, or wearable. The panel 1662 and the touch panel 1652 may be integrated into a single module. The hologram device 1664 may display a stereoscopic image in a space using a light interference phenomenon. The projector 1666 may project light onto a screen so as to display an image. The screen may be disposed in the inside or the outside of the electronic device 1601. According to an example embodiment of the present disclosure, the display 1660 may further include a control circuit for controlling the panel 1662, the hologram device 1664, or the projector 1666.

The interface 1670 may include, for example, an HDMI 1672, a USB 1674, an optical interface 1676, or a D-subminiature (D-sub) 1678. The interface 1670, for example, may be included in the communication interface 170 illustrated in FIG. 1. Additionally or alternatively, the interface 1670 may include, for example, a mobile high-definition link (MHL) interface, an SD card/multi-media card (MMC) interface, or an infrared data association (IrDA) interface.

The audio module 1680 may convert, for example, a sound into an electrical signal or vice versa. At least a portion of elements of the audio module 1680 may be included in the input/output interface 150 illustrated in FIG. 1. The audio module 1680 may process sound information input or output through a speaker 1682, a receiver 1684, an earphone 1686, or the microphone 1688.

The camera module 1691 is, for example, a device for shooting a still image or a video. According to an example embodiment of the present disclosure, the camera module 1691 may include at least one image sensor (e.g., a front sensor or a rear sensor), a lens, an image signal processor (ISP), or a flash (e.g., an LED or a xenon lamp).

The power management module 1695 may manage power of the electronic device 1601. According to an example embodiment of the present disclosure, the power management module 1695 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1696 and a voltage, current or temperature thereof while the battery is charged. The battery 1696 may include, for example, a rechargeable battery and/or a solar battery.

The indicator 1697 may display a specific state of the electronic device 1601 or a part thereof (e.g., the processor 1610), such as a booting state, a message state, a charging state, or the like. The motor 1698 may convert an electrical signal into a mechanical vibration, and may generate a vibration or haptic effect. Although not illustrated, a processing device (e.g., a GPU) for supporting a mobile TV may be included in the electronic device 1601. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various example embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various example embodiments, an electronic device includes a display module, a bracket disposed on a rear surface of the display module, and a first adhesive member configured to fix at least a portion of the display module to the bracket, between the display module and the bracket, wherein the first adhesive member has adhesive force which is reduced to a specified value or less by at least one of force, light, or heat applied from an outside.

According to various example embodiments, the electronic device further includes a cover panel attached to at least a portion of a rear surface of an active area in the display module, wherein the cover panel is implemented to include at least one of a second adhesive member, an intermediate member, and a metal sheet, and wherein at least a portion of the second adhesive member or the intermediate member is separated from the display module by at least one of force or light applied from the outside.

According to various example embodiments, the intermediate member is stretched by force applied in a horizontal direction to the intermediate member such that the second adhesive member is separated from the display module.

According to various example embodiments, the second adhesive member includes a first adhesive layer attached to the display module, a second adhesive layer attached to the intermediate member, and a base material layer interposed between the first adhesive layer and the second adhesive layer, and the second adhesive member is separated from the display module, if the at least one of the force or the light is applied to the first adhesive layer or the base material layer.

According to various example embodiments, the first adhesive layer is stretched by force applied in an outward direction perpendicular to the first adhesive layer such that the second adhesive member is separated from the display module.

According to various example embodiments, the second adhesive member is separated from the display module if UV light is applied to the first adhesive layer.

According to various example embodiments, the electronic device further includes a film layer configured to guide the UV light applied to the first adhesive layer.

According to various example embodiments, the base material layer is implemented with a film layer configured to guide the UV light applied to the first adhesive layer.

According to various example embodiments, the base material layer has a light transmittance of a specified value or more.

According to various example embodiments, the electronic device further includes a shielding layer interposed between the first adhesive layer and the display module.

According to various example embodiments, the first adhesive member is attached to at least a portion of a rear surface of a non-active area in the display module, wherein the first adhesive member includes a first adhesive layer attached to the display module, a second adhesive layer attached to the bracket, and a base material layer interposed between the first adhesive layer and the second adhesive layer, and wherein the first adhesive member is separated from the display module, if force or light is applied to the first adhesive layer or the base material layer from the outside.

According to various example embodiments, the first adhesive layer is stretched by force applied in an outward direction perpendicular to the first adhesive layer such that the first adhesive member is separated from the display module.

According to various example embodiments, the first adhesive member is separated from the display module if UV light is applied to the first adhesive layer.

According to various example embodiments, the base material layer includes a pattern for guiding the UV light applied to the first adhesive layer.

According to various example embodiments, the base material layer has a light transmittance of a specified value or more.

According to various example embodiments, the electronic device further includes an additional adhesive layer interposed between the first adhesive member and the bracket and configured to be stretchable by force applied from the outside.

According to various example embodiments, the electronic device further includes a third adhesive member interposed between a rear surface of the cover panel and the bracket, wherein the third adhesive member includes a first adhesive layer attached to the cover panel, a heat reacted adhesive layer attached to the bracket, and a base material layer interposed between the first adhesive layer and the heat reacted adhesive layer, and wherein the third adhesive member is separated from the cover panel if force or light is applied to the first adhesive layer or the base material layer from the outside.

According to various example embodiments, the first adhesive layer is stretched by force applied in an outward direction perpendicular to the first adhesive layer such that the third adhesive member is separated from the cover panel.

According to various example embodiments, the third adhesive member is separated from the cover panel if UV light is applied to the first adhesive layer.

According to various example embodiments, the base material layer includes a pattern for guiding the UV light applied to the first adhesive layer.

According to various example embodiments, the base material layer has a light transmittance of a specified value or more.

According to various example embodiments, the electronic device further includes a flexible printed circuit board electrically connected with the display module, and a fourth adhesive member configured to bond the cover panel to the flexible printed circuit board, wherein the flexible printed circuit board is interposed between the cover panel and the bracket, wherein the fourth adhesive member includes a first adhesive layer attached to the cover panel, a second adhesive layer attached to the flexible printed circuit board, and a base material layer interposed between the first adhesive layer and the second adhesive layer, and wherein the fourth adhesive member is separated from the cover panel if force or light is applied to the first adhesive layer or the base material layer from the outside.

According to various example embodiments, an electronic device includes a display module, a cover panel attached to at least a portion of a rear surface of an active area in the display module, a bracket configured to fix the display module and the cover panel, on a rear surface of the display module, and a first adhesive member configured to fix the display module and the cover panel, on the rear surface of the active area, wherein the first adhesive member has adhesive force which is reduced to a specified value or less by at least one of force, light, or heat applied from an outside.

According to various example embodiments, the electronic device further includes a substrate interposed between the cover panel and the bracket, and a second adhesive member configured to fix the cover panel and the bracket, between the substrate and the cover panel, wherein the second adhesive member has adhesive force which is reduced to a specified value or less by at least one of force, light, or heat applied from the outside.

According to various example embodiments, an electronic device includes a display module, a cover panel attached to at least a portion of a rear surface of an active area in the display module, a bracket configured to fix the display module and the cover panel, on a rear surface of the display module, and an adhesive member configured to fix the display module and the bracket, on a rear surface of a non-active area in the display module, wherein the adhesive member has adhesive force which is reduced to a specified value or less by at least one of force, light, or heat applied from an outside.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a display module;
a cover panel attached to at least a portion of a rear surface of an active area of the display module,
a bracket disposed below a rear surface of the display module; and
a first adhesive member configured to fix at least a portion of the display module to the bracket, the first adhesive member disposed between the at least portion of the display module and the bracket, wherein the first adhesive member has adhesive force that can be reduced to be detached from the display module or the bracket by at least one of force, light, or heat applied from an outside,
wherein the cover panel comprises a second adhesive member, an intermediate member, and a metal sheet, and
wherein the second adhesive member has adhesive force that can be reduced to be detached from the display module by at least one of force, light, or heat applied from an outside.

2. The electronic device of claim 1, wherein the intermediate member is configured to be stretched by force applied in a horizontal direction to the intermediate member such that the second adhesive member is configured to be separated from the display module.

3. The electronic device of claim 1, wherein the second adhesive member includes:
a first adhesive layer attached to the display module;
a second adhesive layer attached to the intermediate member; and
a base material layer interposed between the first adhesive layer and the second adhesive layer, and
wherein the second adhesive member is configured to be separated from the display module, upon at least one of the force or the light applied to the first adhesive layer or the base material layer.

4. The electronic device of claim 3, wherein the first adhesive layer is configured to be stretched by force applied in an outward direction perpendicular to the first adhesive layer such that the second adhesive member is configured to be separated from the display module.

5. The electronic device of claim 3, wherein the second adhesive member is configured to be separated from the display module if UV light is applied to the first adhesive layer.

6. The electronic device of claim 5, further comprising:
a film layer configured to guide the UV light applied to the first adhesive layer.

7. The electronic device of claim 5, wherein the base material layer comprises a film layer configured to guide the UV light applied to the first adhesive layer.

8. The electronic device of claim 5, wherein the base material layer has a light transmittance of a specified value or more.

9. The electronic device of claim 8, further comprising:
a shielding layer interposed between the first adhesive layer and the display module.

10. The electronic device of claim 1, wherein the first adhesive member is attached to at least a portion of a rear surface of a non-active area of the display module,
wherein the first adhesive member includes:
a first adhesive layer attached to the display module;
a second adhesive layer attached to the bracket; and
a base material layer interposed between the first adhesive layer and the second adhesive layer, and
wherein the first adhesive member is configured to be separated from the display module, if force or light is applied to the first adhesive layer or the base material layer from the outside.

11. The electronic device of claim 10, wherein the first adhesive layer is configured to be stretched by force applied in an outward direction perpendicular to the first adhesive layer such that the first adhesive member is configured to be separated from the display module.

12. The electronic device of claim 10, wherein the first adhesive member is configured to be separated from the display module if UV light is applied to the first adhesive layer.

13. The electronic device of claim 10, further comprising:
an additional adhesive layer interposed between the first adhesive member and the bracket and configured to be stretchable by force applied from the outside.

14. The electronic device of claim 1, further comprising:
a third adhesive member interposed between a rear surface of the cover panel and the bracket,
wherein the third adhesive member includes:
a first adhesive layer attached to the cover panel;
a heat reacted adhesive layer attached to the bracket; and
a base material layer interposed between the first adhesive layer and the heat reacted adhesive layer, and
wherein the third adhesive member is configured to be separated from the cover panel if force or light is applied to the first adhesive layer and/or the base material layer from the outside.

15. The electronic device of claim 14, wherein the first adhesive layer is configured to be stretched by force applied in an outward direction perpendicular to the first adhesive layer such that the third adhesive member is configured to be separated from the cover panel.

16. The electronic device of claim 1, further comprising:
a flexible printed circuit board electrically connected with the display module; and
a fourth adhesive member configured to bond the cover panel to the flexible printed circuit board,
wherein the flexible printed circuit board is interposed between the cover panel and the bracket,
wherein the fourth adhesive member includes:
a first adhesive layer attached to the cover panel;
a second adhesive layer attached to the flexible printed circuit board; and
a base material layer interposed between the first adhesive layer and the second adhesive layer, and
wherein the fourth adhesive member is configured to be separated from the cover panel if force or light is applied to the first adhesive layer or the base material layer from the outside.

17. An electronic device comprising:
a display;
a cover panel attached to at least a portion of a rear surface of an active area of the display;
a bracket configured to fix the display and the cover panel, below a rear surface of the display;
a substrate interposed between the cover panel and the bracket; a first adhesive configured to fix the display and the cover panel, on the rear surface of the active area; and
a second adhesive configured to fix the cover panel and the bracket, between the substrate and the cover panel,
wherein the first adhesive has adhesive force which is configured to be reduced to be detached from the display or the cover panel by at least one of force, light, or heat applied from an outside, and
wherein the second adhesive has adhesive force that can be reduced to be detached from the cover panel by at least one of force, light, or heat applied from an outside.

18. An electronic device comprising:
a display;
a cover panel attached to at least a portion of a rear surface of an active area of the display;
a bracket configured to fix the display and the cover panel, below a rear surface of the display;

a substrate interposed between the cover panel and the bracket and a first adhesive configured to fix the display and the bracket, on a rear surface of a non-active area of the display, and a second adhesive configured to fix the cover panel and the bracket, between the substrate and the cover panel, wherein the first adhesive has adhesive force that can be reduced to be detached from the display or the bracket by at least one of force, light, or heat applied from an outside, and wherein the second adhesive has adhesive force that can be reduced to be detached from the cover panel by at least one of force, light, or heat applied from an outside.

* * * * *